US010196480B1

(12) United States Patent
Alakhras

(10) Patent No.: US 10,196,480 B1
(45) Date of Patent: Feb. 5, 2019

(54) CONDUCTIVE COPOLYMER AND A METHOD OF MAKING THEREOF

(71) Applicant: Imam Abdulrahman Bin Faisal University, Dammam (SA)

(72) Inventor: Fadi Atef Abed Alakhras, Dammam (SA)

(73) Assignee: Imam Abdulrahman Bin Faisal University, Dammam (SA)

(*) Notice: Subject to any disclaimer, the term of this patent is extended or adjusted under 35 U.S.C. 154(b) by 4 days.

(21) Appl. No.: 15/679,706

(22) Filed: Aug. 17, 2017

(51) Int. Cl.
*C08G 61/12* (2006.01)

(52) U.S. Cl.
CPC ......... *C08G 61/126* (2013.01); *C08G 61/123* (2013.01); *C08G 2261/122* (2013.01); *C08G 2261/3225* (2013.01); *C08G 2261/3226* (2013.01); *C08G 2261/3243* (2013.01); *C08G 2261/44* (2013.01); *C08G 2261/50* (2013.01)

(58) Field of Classification Search
CPC ............... C08G 61/123; C08G 61/126; C08G 2261/3225; C08G 2261/3226; C08G 2261/3243
See application file for complete search history.

(56) References Cited

U.S. PATENT DOCUMENTS

| 5,855,819 A | 1/1999 | DeSimone et al. |
| 7,687,582 B1 | 3/2010 | Luebben et al. |
| 2011/0136973 A1* | 6/2011 | Kastler ............... C08G 61/126 524/609 |
| 2015/0136224 A1* | 5/2015 | Shi ..................... H01L 51/0074 136/256 |

FOREIGN PATENT DOCUMENTS

| CN | 104479113 A | 4/2015 |
| JP | 62-167330 A | 7/1987 |
| JP | 2002-226578 A | 8/2002 |
| JP | 2010-167390 A | 8/2010 |

OTHER PUBLICATIONS

Ustamehmetoglu, Belkis et al "Electrochemical copolymerization of benzothiophene with thiophene" Aug. 12, 2013, Progress in Organic Coatings, 76, 1515-1521.*
Wei-Hsuan Chang, et al., "A Selenophene Containing Benzodithiophene-alt-thienothiophene Polymer for Additive-Free High Performance Solar Cell", Macromolecules, Sep. 1, 2004, pp. A-G.

* cited by examiner

Primary Examiner — Ling Siu Choi
Assistant Examiner — David L Miller
(74) Attorney, Agent, or Firm — Oblon, McClelland, Maier & Neustadt, L.L.P.

(57) ABSTRACT

A conducting polymer which may have one redox couple and/or enhanced redox capacity. The polymer is a copolymer prepared by electropolymerizing a mixture of monomers.

19 Claims, 11 Drawing Sheets

CONDUCTIVE COPOLYMER AND A METHOD OF MAKING THEREOF

STATEMENT REGARDING PRIOR DISCLOSURES BY THE INVENTORS

Aspects of this technology are described in an article "Spectroelectrochemical investigations of electrochemically synthesized selenophene-thianaphthene copolymers" by Fadi Alakhras in Journal of Electroanalytical Chemistry, 2017, pages 63-68, which is incorporated herein by reference in its entirety.

BACKGROUND OF THE DISCLOSURE

Field of the Invention

This disclosure relates to conducting polymers with extended z conjugation along the molecular backbone.

Description of the Related Art

Intrinsically conductive polymers have been intensely researched since three decades ago, when chemically synthesized polyacetylenes demonstrated increases in electrical conductivity after being exposed to iodine vapor (T. K. Das, S. Prusty, Polym.-Plast. Technol. Eng. 51 (2012) 1487; P. P. Deshpande, N. G. Jadhav, V. J. Gelling, D. Sazou, J. Coat. Technol. Res. 11 (2014) 473; and P. Sengodu, A. D. Deshmukh, RSC Adv. 5 (2015) 42109, each incorporated herein by reference in their entirety). Conducting polymers can be switched from a neutral to an oxidized conducting state by electrochemical doping. Such polymers are also referred to as "synthetic metals".

Conducting polymers vary considerably in their chemical and environmental stability with a large range of conductivities. The variation may be due to the differences in the monomers of the conducting polymers. Polythiophene derivatives form some of the most environmentally and thermally stable materials (R. Bobade, J. Polym. Eng. 31 (2011) 209; RD. McCullough, Adv. Mater. 10 (1998) 93; L. Shi, J. Roncali, F. Garnier, J. Electroanal. Chem. 263 (1989) 155; A. Kassmi, F. Fache, M. Lemaire, J. Electroanal. Chem. 373 (1994) 241; L. Zhou, G. Xue, Synth. Met. 87 (1997) 193; J. Xu, G. Shi, Z. Xu, F. Chen, X. Hong, J. Electroanal. Chem. 514 (2001) 16; J. Xu, G. Shi, F. Chen, F. Wang, J. Zhang, X. Hong, J. Appl. Polym. Sci. 87 (2003) 502, each incorporated herein by reference in their entirety). As one of the distinctive low band gap conducting polymers, polyisothianaphthene (a polymer of nonclassical thiophene) has been prepared and has been studied extensively (F. Wudl, M. Kobayashi, A. J. Heeger, J. Organomet. Chem. 49 (1984) 3382; M. Kobayashi, N. Colaneri, H. Moysel, F. Wudl, A. J. Heeger, J. Chem. Phys. 82 (1985) 5717; N. Colaneri, M. Kobayashi, A. J. Heeger, F. Wudl, Synth. Met. 14 (1986) 45; and A. K. Bakhshi, C. M. Liegener, J. Ladik, Synth. Met. 30 (1989) 79, each incorporated herein by reference in their entirety).

Thianaphthene (ThN), also known as benzothiophene, is an isomer of isothianaphthene. There are limited studies on polythianaphthene (H. An, M. Seki, R. Yosomiya, Makromol. Chem., Rapid Commun. 8 (1987) 325; F. Wang, G. Shi, F. Chen, J. Xu, J. Zhang, J. Electroanal. Chem. 510 (2001) 29; J. Xu, G. Shi, J. Zhang, X. Hong, Macromol. Chem. Phys. 203 (2002) 2385, each incorporated herein by reference in their entirety). Compagnone et al. have described the immobilization of glucose oxidase at a platinum electrode by entrapment in the polythianaphthene films for the development of a glucose biosensor (D. Compagnone, G. Federici, J. V. Bannister, Electroanalysis 7 (1995) 1151, incorporated herein by reference in its entirety).

Despite some chemical similarities between thiophene and selenophene rings, there are only a few articles on polyselenophene (PSe) films in optoelectronic applications (A. Patra, M. Bendikov, J. Mater. Chem. 20 (2010) 422; J. Xu, J. Hou, S. Zhang, G. Nie, S. Pu, L. Shen, Q. Xiao, J. Electroanal. Chem. 587 (2005) 345; and R. Yang, R. Tian, J. Yan, Y. Zhang, J. Yang, Q. Hou, W. Yang, C. Zhang, Y. Cao, Macro-molecules 38 (1005) 244, each incorporated herein by reference in their entirety). Selenophene-based materials have not been studied widely due to its higher price, limited number of commercially available derivatives and less developed chemistry. Polyselenophene has been synthesized previously and its chemical, electrochemical and optical properties were investigated. However, the quality of the selenophene films was poor i.e. the film quality depended on the combination of solvent and electrolyte and the conductivity was still far below typical values for polythiophenes (10 to 100 S cm$^{-1}$).

Spectroelectrochemical investigations of polyselenophene conducting materials have been depicted previously (M. A. Del Valle, L. Ugalde, F. R. Diaz, M. E. Bodini, J. C. Berne'de, A. Chaillou, Polym. Bull. 51 (2003) 55; Y. Narita, I. Hagiri, N. Takahashi, K. Takeda, Jpn. J. Appl. Phys. 43 (2004) 4248; and C. S. Wang, A. Ellern, J. Y. Becker, J. Bernstein, Adv. Mater. 7 (1995) 644, each incorporated herein by reference in their entirety). Nevertheless, the conductivity is still much lower than the conductivity of doped polythiophenes (R. J. Waltman, J. Bargon, Can. J. Chem. 64 (1986) 76, incorporated herein by reference in its entirety).

Semiconducting super lattices (or copolymers) have been studied considerably (D. A. B. Miller, D. S. Chemla, T. C. Damen, A. C. Gossard, W. Wiegmann, T. H. Wood, C. A. Burrus, Appl. Phys. Lett. 45 (1984) 13; M. Seel, C. M. Liegener, W. F. Srner, J. Ladik, Phys. Rev. B 37 (1988) 956; J. Arjomandi, F. Alakhras, W. Al-Halasah, R. Holze, Jordan J. Chem. 4 (2009) 279; and R. Holze, Electrochim. Acta 56 (2011) 10479, each incorporated herein by reference in their entirety). The properties of the copolymers could be tailored by choosing two semiconducting components and arranging (e.g., alternating arrangement) these components in the copolymer chains. This design flexibility makes such copolymers more feasible and potentially useful in terms of conductivity and redox stability (F. Alakhras, R. Holze, J. Solid State Electrochem. 12 (2008) 81; F. Alakhras, R. Holze, Synth. Met. 157 (2007) 109; and J. Arjomandi, S. Zamanian, M. H. Parvin, F. Alakhras, J. Electrochem. Soc. 162 (2015), E191, each incorporated herein by reference in their entirety). Very recently, Alakhras has reported on the successful electrosynthesis of mixed copolymers containing selenophene and thiophene/3-chlorothiophene rings (F. Alakhras, J. Braz. Chem. Soc. 27 (2016) 941-949; F. Alakhras, Helv. Chim. Acta 98 (2015) 851; F. Alakhras, Arab. J. Sci. Eng. 40 (2015) 2913; F. Alakhras, Mater. Sci. Pol. 33 (2015) 25; and F. Alakhras, Ch&ChT 8 (2014) 265, each incorporated herein by reference in their entirety). The redox stability and electrical conductivity of the obtained films have been remarkably improved.

Therefore, it is an objective of the disclosure to prepare and provide a conductive copolymer with desirable electrical properties.

SUMMARY

A first aspect of the disclosure relates to a copolymer, comprising a polymerization product of: (i) a first monomer represented by formula (I); and (ii) at least one second monomer selected from the group consisting of a compound represented by formula (II) and a compound represented by formula (III); where a mole ratio of the at least one second monomer to the first monomer is from 10:1 to 1:10, and formulae (I), (II) and (III) are:

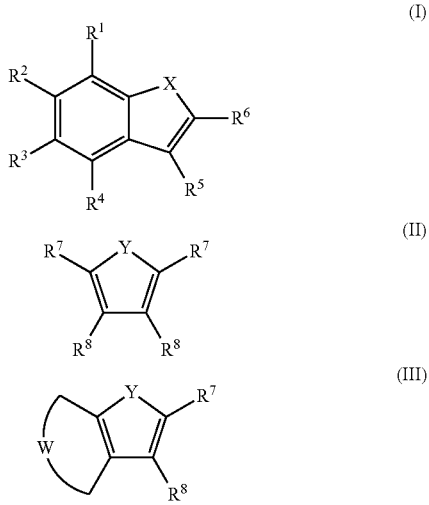

where X and Y are independently a sulfur, a selenium, or tellurium;

W is an optionally substituted arylene, with the proviso that when the at least one second monomer is the compound represented by formula (III), the at least one second monomer is structurally different from the first monomer;

$R^1$, $R^2$, $R^3$, $R^4$, are independently a hydrogen, a hydroxy, a thiol, a fluoro, a chloro, a bromo, an iodo, a nitro, a cyano, an amino, a carboxy, an optionally substituted alkyl, an optionally substituted cycloalkyl, an optionally substituted arylalkyl, an optionally substituted aryl, an optionally substituted alkanoyl, or an optionally substituted aroyl; and $R^5$, $R^6$, and each of $R^7$ and $R^8$ are independently a hydrogen, a fluoro, a chloro, a bromo, an iodo, a nitro, a cyano, a carboxy, an optionally substituted alkyl, an optionally substituted cycloalkyl, an optionally substituted arylalkyl, an optionally substituted aryl, an optionally substituted alkanoyl, or an optionally substituted aroyl.

In one embodiment, the mole ratio of the at least one second monomer to the first monomer is from 5:1 to 1:5.

In one embodiment, the mole ratio of the at least one second monomer to the first monomer is from 4:1 to 1:1.

In one embodiment, the first monomer is:

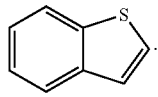

In one embodiment, Y is selenium.
In one embodiment, the compound represented by formula (II) is:

In one embodiment, a redox activity of the copolymer decreases by less than 15% after the copolymer is subjected to 20-30 voltage cycles.

In one embodiment, the copolymer is free of reacted non-conjugated monomers.

In one embodiment, the copolymer is free of a non-conjugated polymeric block.

In one embodiment, a band gap energy value of the copolymer is in a range of 1.9-2.1 eV.

In one embodiment, an electrical conductivity of the copolymer is in a range of 0.3-0.4 S/cm.

A second aspect of the disclosure relates to a method for making the copolymer of the first aspect, the method comprising: (i) mixing the first monomer and the at least one second monomer in a solution comprising a solvent and an electrolyte in the presence of a working electrode, a counter electrode, and a reference electrode; and (ii) applying a potential to the resulting solution thereby polymerizing the first monomer and the at least one second monomer.

In one embodiment, the potential is applied for 0.5-10 minutes.

In one embodiment, the potential is in a range of 1.45-1.55 V.

In one embodiment, an area of the working electrode is in a range of 0.05-1 $cm^2$.

In one embodiment, the electrolyte is tetrabutylammonium tetrafluoroborate.

In one embodiment, the electrolyte is present at a concentration in a range of 0.01-1 M in the solution.

In one embodiment, the solvent is acetonitrile.
In one embodiment, the first monomer is:

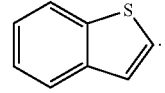

In one embodiment, the compound represented by formula (II) is:

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1A:
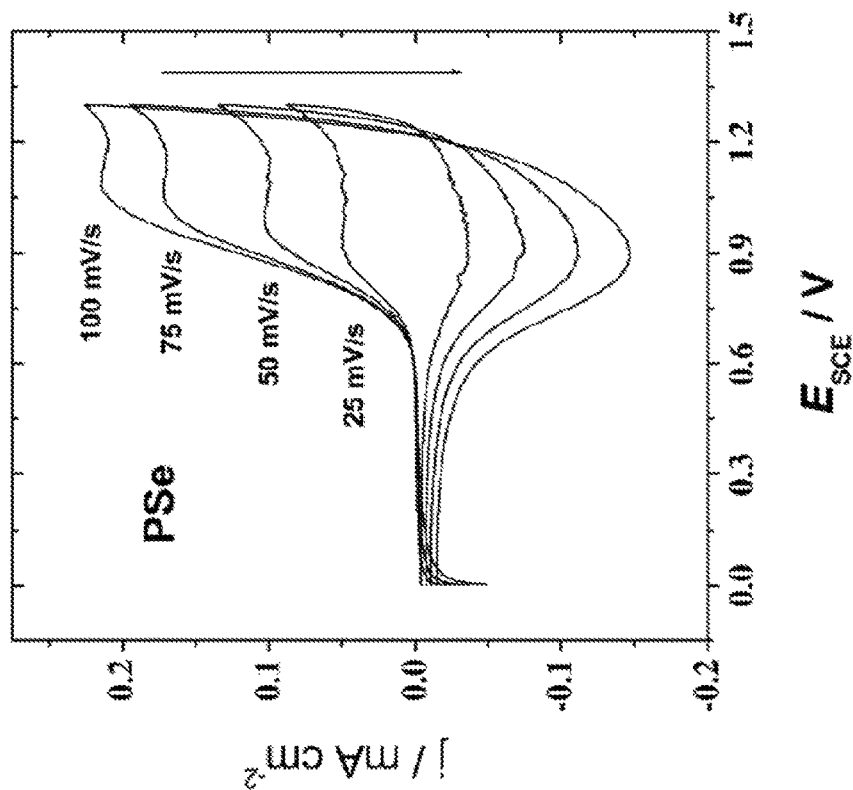
FIG. 1A is an overlay of the anodic polarization curves of monomers, selenophene (Se) and thianaphthene (ThN).

Embodiments of the present disclosure will now be described more fully hereinafter with reference to the accompanying drawings, in which some, but not all of the embodiments of the disclosure are shown.

The present disclosure will be better understood with reference to the following definitions.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

The term "alkyl", as used herein, unless otherwise specified, refers to a straight, branched, or cyclic hydrocarbon fragment. Non-limiting examples of such hydrocarbon fragments include methyl, ethyl, propyl, isopropyl, butyl, isobutyl, I-butyl, pentyl, isopentyl, neopentyl, hexyl, isohexyl, 3-methylpentyl, 2,2-dimethylbutyl, and 2,3-dimethylbutyl. As used herein, the term "cycloalkyl" or "cyclic hydrocarbon" refers to a cyclized alkyl group. Exemplary cyclic hydrocarbon (i.e. cycloalkyl) groups include, but are not limited to, cyclopropyl, cyclobutyl, cyclopentyl, cyclohexyl, norbornyl, and adamantyl. Branched cycloalkyl groups, such as exemplary 1-methylcyclopropyl and 2-methycyclopropyl groups, are included in the definition of cycloalkyl as used in the present disclosure.

The term "aryl", as used herein, and unless otherwise specified, refers to a substituent that is derived from an aromatic hydrocarbon (arene) that has had a hydrogen atom removed from a ring carbon atom. Aryl includes phenyl, biphenyl, naphthyl, anthracenyl, and the like.

The term "arylalkyl" as used in this disclosure refers to a straight or branched chain alkyl moiety having 1 to 8 carbon atoms that is substituted by an aryl group or a substituted aryl group having 6 to 12 carbon atoms, and includes benzyl, 2-phenethyl, 2-methylbenzyl, 3-methylbenzyl, 4-methylbenzyl, 2,4-dimethylbenzyl, 2-(4-ethylphenyl)ethyl, 3-(3-propylphenyl)propyl.

The term "alkanoyl" as used in this disclosure refers to an alkyl group having 2 to 18 carbon atoms that is bound with a double bond to an oxygen atom. Examples of alkanoyl include, acetyl, propionyl, butyryl, isobutyryl, pivaloyl, valeryl, hexanoyl, octanoyl, lauroyl, stearoyl.

The term "aroyl" as used in this disclosure refers to an arylalkyl group with an alkyl carbon atom bound with a double bond to an oxygen atom and the alkyl carbon atom is adjacent to a ring carbon atom. Examples of aroyl are benzoyl and naphthoyl, and "substituted aroyl" may refer to benzoyl or naphthoyl substituted by at least one substituent including those selected from halogen, amino, vitro, hydroxy, alkyl, alkoxy and haloalkyl on the benzene or naphthalene ring.

The term "arylene" refers to a substituent derived from an arene that has had a hydrogen atom removed from each of two adjacent ring carbon atoms. Exemplary arenes include an optionally substituted benzene, naphthalene, anthracene, phenanthrene, tetracene, chrysene, triphenylene, pyrene, pentacene, benzo[a]pyrene, corannulene, benzo[ghi]perylene, coronene, ovalene, benzo[c]fluorene. In some embodiments, the arylene is a phenylene.

As used herein, the term "substituted" refers to compounds where at least one hydrogen atom is replaced with a non-hydrogen group, provided that normal valencies are maintained and that the substitution results in a stable compound. When a compound or a R group (denoted as $R^1$, $R^2$, and so forth) is noted as "optionally substituted", the substituents are selected from the exemplary group including, but not limited to, aroyl; halogen (e.g. chlorine, bromine, fluorine or iodine), alkyl; alkoxy (i.e. straight or branched chain optionally substituted alkoxy having 1 to 10 carbon atoms, and includes, for example, methoxy, ethoxy, propoxy, isopropoxy, butoxy, isobutoxy, secondary butoxy, tertiary butoxy, pentoxy, isopentoxy, hexyloxy, heptyloxy, octyloxy, nonyloxy and decyloxy); cycloalkyloxy (e.g., cyclopentyloxy, cyclohexyloxy, and cycloheptyloxy); aryloxy including phenoxy and phenoxy substituted with halo, alkyl, alkoxy, and haloalkyl which refers to straight or branched chain alkyl having 1 to 8 carbon atoms which are substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromoethyl, 2,2-difluoroethyl, 3,3-dichloropropyl, 3,3-difluoropropyl, 4,4-dichlorobutyl, 4,4-difluorobutyl, trichloromethyl, trifluoromethyl, 2,2,2-tri-fluoroethyl, 2,3,3-trifluoropropyl, 1,1,2,2-tetrafluoroethyl, 2,2,3,3-tetrafluoropropyl; hydrocarbyl; substituted hydrocarbyl; arylalkyl; hydroxy; oxo; alkanoyl; alkanoyloxy; amino; alkylamino; arylamino; arylalkylamino; disubstituted amines (e.g. in which the two amino substituents are selected from the exemplary group including, but not limited to, alkyl, aryl, or arylalkyl); alkanylamino; arylamino; alkanoylamino; substituted alkanoylamino; substituted arylamino; thiol; alkylthio; arylthio; arylalkylthio; alkylthiono; arylthiono; aryalkylthiono; alkylsulfonyl; arylsulfonyl; arylalkylsulfonyl; sulfonamido (e.g. —SO$_2$NH$_2$); substituted sulfonamide (e.g., —SO$_2$NHalkyl, —SO$_2$NHaryl, —SO$_2$NHarylalkyl or in cases where there are two substituents on the nitrogen, each substituent is independently an alkyl, an aryl, or an arylalkyl); nitro; cyano; carboxy; carbamyl (e.g. —CONH$_2$); substituted carbamyl (e.g. —CONHalkyl, —CONHaryl, —CONHarylalkyl or in cases where there are two substituents on the nitrogen, each substituent is independently an alkyl, an aryl, or an arylalkyl); alkoxycarbonyl; aryl; substituted aryl; guanidine; heteroarylcarbonyl; substituted heteroarylcarbonyl; heterocyclyl; substituted heterocyclyl; and mixtures thereof and the like. The substituents may be either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety).

The term "heteroaryl" refers to an aryl group where at least one carbon atom is replaced with a heteroatom (e.g. nitrogen, oxygen, sulfur) and can be indolyl, furyl, imidazolyl, triazolyl, triazinyl, oxazolyl, isoxazolyl, thiazolyl, isothiazolyl, pyrazolyl, pyrrolyl, pyrazinyl, tetrazolyl, pyridyl (or its N-oxide), thienyl, pyrimidinyl (or its N-oxide), 1H-indolyl, isoquinolyl (or its N-oxide), or quinolyl (or its N-oxide), for example.

The term "heterocyclyl" as used in this disclosure refers to a 3-8, preferably 4-8, more preferably 4-7 membered monocyclic ring or a fused 8-12 membered bicyclic ring which may be saturated or partially unsaturated, which monocyclic or bicyclic ring contains 1 to 4 heteroatoms selected from oxygen, nitrogen, silicon or sulfur. Examples of such monocyclic rings include oxaziridinyl, homopiperazinyl, oxiranyl, dioxiranyl, aziridinyl, pyrrolidinyl, azetidinyl, pyrazolidinyl, oxazolidinyl, piperidinyl, piperazinyl, morpholinyl, thiomorpholinyl, thiazolidinyl, hydantoinyl, valerolactamyl, oxiranyl, oxetanyl, dioxolanyl, dioxanyl, oxathiolanyl, oxathianyl, dithianyl, dihydrofuranyl, tetrahydrofuranyl, dihydropyranyl, tetrahydropyranyl, tetrahydropyridyl, tetrahydropyrimidinyl, tetrahydrothiophenyl, tetrahydrothiopyranyl, diazepanyl and azepanyl. Examples of such bicyclic rings include indolinyl, isoindolinyl, benzopyranyl, quinuclidinyl, 2,3,4,5-tetrahydro-1,3,benzazepine, 4-(benzo-1,3,dioxol-5-methyl)piperazine, and tetrahydroisoquinolinyl. Further, "substituted heterocyclyl" may refer to a heterocyclyl ring which has one or more oxygen atoms bonded to the ring (i.e. as ring atoms). Preferably, said atom which is bonded to the ring selected from nitrogen or sulfur. An example of a heterocyclyl substituted with one or more oxygen atoms is 1,1-dioxido-1,3-thiazolidinyl.

The term "alkylthio" as used in this disclosure refers to a divalent sulfur with alkyl occupying one of the valencies and includes the groups methylthio, ethylthio, propylthio, butylthio, pentylthio, hexylthio, octylthio.

The term "heteroarylcarbonyl" as used in this disclosure refers to a heteroaryl moiety with 5 to 10 membered mono- or fused-heteroaromatic ring having at least one heteroatom selected from nitrogen, oxygen and sulfur as mentioned above and a carbonyl group (such as an ester, an acid chloride, a ketone, and an aldehyde) attached to the ring, and includes, for example, furoyl, nicotinoyl, isonicotinoyl, pyrazolylcarbonyl, imidazolylcarbonyl, pyrimidinylcarbonyl, and benzimidazolyl-carbonyl. Further, "substituted heteroarylcarbonyl" may refer to the above mentioned heteroarylcarbonyl which is substituted by at least one substituent selected from halogen, amino, vitro, hydroxy, alkoxy and haloalkyl on the heteroaryl nucleus, and includes, for example, 2-oxo-1,3-dioxolan-4-ylmethyl, 2-oxo-1,3-dioxan-5-yl.

The term "hydrocarbyl" as used herein refers to a univalent hydrocarbon group containing up to about 24 carbon atoms (i.e. a group containing only carbon and hydrogen atoms) and that is devoid of olefinic and acetylenic unsaturation, and includes alkyl, cycloalkyl, alkyl-substituted cycloalkyl, cycloalkyl-substituted cycloalkyl, cycloalkylalkyl, aryl, alkyl-substituted aryl, cycloalkyl-substituted aryl, arylalkyl, alkyl-substituted aralkyl, and cycloalkyl-substituted aralkyl. Further, functionally-substituted hydrocarbyl groups may refer to a hydrocarbyl group that is substituted by one or more functional groups selected from halogen atoms, amino, nitro, hydroxy, hydrocarbyloxy (including alkoxy, cycloalkyloxy, and aryloxy), hydrocarbylthio (including alkylthio, cycloalkylthio, and arylthio), heteroaryl, substituted heteroaryl, alkanoyl, aroyl, substituted aroyl, heteroarylcarbonyl, and substituted heteroarylcarbonyl.

The present disclosure is further intended to include all isotopes of atoms occurring in the present compounds. Isotopes include those atoms having the same atomic number but different mass numbers. By way of general example, and without limitation, isotopes of hydrogen include deuterium and tritium. Isotopes of carbon include $^{13}$C and $^{14}$C. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

An aspect of the disclosure relates to a copolymer, containing a polymerization product of: (i) a first monomer represented by formula (I); and (ii) at least one second monomer which may be a compound represented by formula (II) and/or a compound represented by formula (III). Formulae (I), (II) and (III) are:

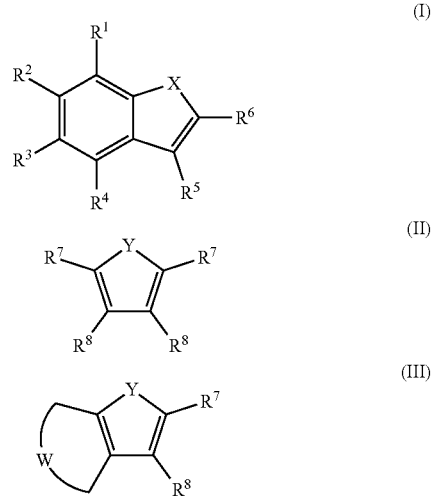

where X and Y are independently sulfur, selenium, or tellurium;

W is an optionally substituted arylene, with the proviso that when the at least one second monomer is the compound represented by formula (III), the at least one second monomer is structurally different from the first monomer;

$R^1$, $R^2$, $R^1$, $R^4$, are independently a hydrogen, a hydroxy, a thiol, a fluoro, a chloro, a bromo, an iodo, a nitro, a cyano, an amino, a carboxy, an optionally substituted alkyl, an optionally substituted cycloalkyl, an optionally substituted arylalkyl, an optionally substituted aryl, an optionally substituted alkanoyl, or an optionally substituted aroyl; and $R^5$, $R^6$, and each of $R^7$ and $R^8$ are independently a hydrogen, a fluoro, a chloro, a bromo, an iodo, a nitro, a cyano, a carboxy, an optionally substituted alkyl, an optionally substituted cycloalkyl, an optionally substituted arylalkyl, an optionally substituted aryl, an optionally substituted alkanoyl, or an optionally substituted aroyl.

The first monomer may be thianaphthene, thianaphthene-2-methanol, 5-methyl-1-thianaphthene, 2-cyanobenzothiophene, 3-methylbenzothiophene, 5-chloro-3-methyl-1-thianaphthene, 1-benzothiophen-2-ylmethylamine, 1-(3-chloro-1-benzothien-2-yl)methanamine hydrochloride, (5-chloro-1-benzothiophen-3-yl)methanol, 2-(4-fluorophenyl)-1-benzothien-3-yl methyl ether, 3-(bromomethyl)-1-thianaphthene, 3-bromo-benzoselenophene, benzotellurophene, or 3-bromo-5-methoxy-benzoselenophene. The compound of formula (II) may be thiophene, 3-alkylthiophene, 2-chloro-3-methylthiophene, 2,5-dichloro-3-methylthiophene, 2,3-dichlorothiophene, 2-(trimethylacetyl)thiophene, 5-chloro-2-thiophenecarbonitrile, 4-bromo-2-methylthiophene, 2-bromo-3-dodecylthiophene, 2-bromo-3-hexylthiophene, selenophene, or tellurophene. The compound of formula (III) may be 3-bromo-1-selena-cyclopenta(a)naphthalene, 1-bromo-3-selena-cyclopenta(a)naphthalene, thianaphthene, thianaphthene-2-methanol, 5-methyl-1-thianaphthene, 2-cyanobenzothiophene, 3-methylbenzothiophene, 5-chloro-3-methyl-1-thianaphthene, 1-benzothiophen-2-ylmethylamine, 1-(3-chloro-1-benzothien-2-yl)methanamine hydrochloride, (5-chloro-1-benzothiophen-3-yl)methanol, 2-(4-fluorophenyl)-1-benzothien-3-yl methyl ether, 3-(bromomethyl)-1-thianaphthene, 3-bromo-benzoselenophene, benzotellurophene, or 3-bromo-5-methoxy-benzoselenophene. In some embodiments, X is sulfur and Y is selenium. In preferred embodiments, the first monomer is thianaphthene and the at least one second monomer is selenophene.

The monomers described herein may be commercially available or prepared in-house according to published methods known to one of ordinary skill in the art. For example, the compound of formula (II) may be prepared by the following method. Zirconocene dichloride may be mixed with an alkyne (e.g., $R^7$—≡—$R^8$) in an aprotic organic solvent (e.g., tetrahydrofuran), thereby forming a mixture. The mixture may be agitated and/or cooled to −80° C. to −70° C., or −78° C. to −74° C. with an ice-acetone bath. After which, an organolithium compound (e.g., n-butyllithium, sec-butyllithium, isobutyllithium, or tert-butyllithium) dissolved in the same or different organic solvent may be added to the cooled mixture. The reaction mixture may be agitated for 10 minutes to 10 hours, 1-5 hours, or 2-3 hours at −80° C. to −70° C., or −78° C. to −74° C., or 20-30° C., 22-28° C., or 24-26° C. Prior to adding the chalcogen chloride (i.e., sulfur dichloride, selenium chloride (e.g., $Se_2Cl_2$, $SeCl_4$), and/or tellurium chloride (e.g., $TeCl_4$, $Te_3Cl_2$)), the reaction mixture may be cooled to −80° C. to −70° C., or −78° C. to −74° C. if a temperature of the reaction mixture is hotter than −70° C. Subsequently, the chalcogen chloride may be added neat or in the same or different organic solvent, thereby forming the compound of formula (II) in the final reaction mixture. The final reaction mixture may be agitated at 20-30° C., 22-28° C., or 24-26° C. for 0.5-5 hours, or 1-3 hours. A concentration of zirconocene dichloride in the final reaction mixture may be in a range of 0.1-2 M, 0.3-1.5 M, or 0.4-0.7 M. A concentration of the alkyne in the mixture may be in a range of 0.2-4 M, 0.5-3 M, or 0.5-1.5 2. A mole ratio of the zirconocene dichloride to the alkyne may be in a range of 1:1 to 1:5, or 1:2 to 1:3. A concentration of the organolithium compound in the final reaction mixture may be 0.1-4 M, 0.3-3 M, or 0.8-2 M. A mole ratio of the zirconocene dichloride to the organolithium compound may be in a range of 1:1 to 1:5, or 1:2 to 1:3. A concentration of chalcogen chloride in the final reaction mixture may be 0.1-1 M, 0.2-0.7 M, or 0.4-0.6 M. A mole ratio of zirconocene dichloride to chalcogen chloride may be in a range of 1:1 to 1:3, 1:1.2 to 1:2, or 1:1.3 to 1:1.5. The compound of formula (II) may be purified and isolated using methods known to one skilled in the art such as aqueous work-up, extraction with organic solvents, distillation, crystallization, column chromatography, and high pressure liquid chromatography (HPLC) (normal phase or reversed phase). Agitation methods include, without limitation, using an agitator, a vortexer, a rotary shaker, a magnetic stirrer, a centrifugal mixer, an overhead stirrer, an ultrasonic probe, or placing the reaction vessel in an ultrasonic bath.

The copolymer may be a block copolymer, an alternating copolymer, a periodic copolymer, a terpolymer, a gradient copolymer, or a statistical copolymer. Block copolymers comprise two or more homopolymer subunits linked by covalent bonds. The union of the homopolymer subunits may require an intermediate non-repeating subunit, known as a junction block. Block copolymers with two or three distinct blocks are called diblock copolymers and triblock copolymers, respectively. Statistical copolymers are copolymers in which the sequence of monomer residues follows a statistical rule. That is, the probability of finding a particular monomer residue at a particular point in the chain is equal to the mole fraction of that monomer residue in the chain. The statistical copolymer may be referred to as a truly random copolymer. Periodic copolymers have the monomers (e.g., A and B units) arranged in a repeating sequence (e.g., $(A-B-A-B-B-A-A-A-A-B-B-B)_n$). In an embodiment where both compounds of formula (II) and (III) are present, the copolymer is a terpolymer (i.e., a copolymer containing three distinct monomers). In an embodiment where either the compound of formula (II) or (III) is present, and the mole ratio of the first monomer to the at least one second monomer is about 1:1, the copolymer is an alternating copolymer with regular alternating A and B (e.g., $(A-B)_n$), where A represents the first monomer and B represents the at least one second monomer. In an embodiment where either the compound of formula (II) or (III) is present, the copolymer may be a gradient copolymer which exhibits a gradual change in composition along the polymer chain from mostly A units to mostly B units.

Copolymers may be linear or branched. Linear copolymers contain a single main chain while branched copolymers contain a single main chain with one or more polymeric side chains. Branched copolymers include, without limitation, star copolymers, brush copolymers, and comb copolymers.

A number average molecular weight of the copolymer may range from 200 Da to 1,000 kDa, 1-500 kDa, or 10-200 kDa. The number average molecular mass of the copolymer may be determined by gel permeation chromatography, viscometry via the (Mark-Houwink equation), colligative methods (e.g., vapor pressure osmometry, end-group determination) and $^1$H NMR. The copolymer may have a polydispersity index of 1-20, 1.5-15, 2-10, or 3-8. The polydispersity index is used as a measure of the broadness of a molecular weight distribution of a polymer. The larger the polydispersity index, the broader the molecular weight. A monodisperse polymer, in which all the chain lengths are equal (such as a protein), has a polydispersity index of 1. The polydispersity index is defined by:

$$\text{Polydispersity index} = \frac{M_w}{M_n}$$

where $M_w$ is a weight average molecular weight, and $M_n$ is a number average molecular weight of the polymer. The weight average molecular mass may be determined by static light scattering, small angle neutron scattering, X-ray scattering, and sedimentation velocity.

A crystallinity of the copolymer may be in a range of 60-100%, preferably 60-80%, more preferably 65-75%. The crystallinity may be determined by differential scanning calorimetry (DSC) and/or X-ray diffraction analysis (XRD). The crystallization peak temperature, as determined by crystallization analysis fraction (CRYSTAF), may lie within the range of 70-100° C., preferably 75-95° C., preferably 80-90° C., preferably 80-85° C., more preferably 82-84° C. The physical characteristics described herein may be important and/or relevant to the use of the copolymer in electronic applications since highly crystalline polymers are rigid, high melting, and less affected by solvent penetration. Crystallinity makes a polymers strong, but also lowers their impact resistance.

An effective conjugation length of the copolymer may be up to 60 monomer units, up to 50 units, or 4-30 units, 10-25 units, or 15 to 20 units. Conjugation relies upon overlap of the π-orbitals of the heteroaromatic rings, which, in turn, requires the heteroaromatic rings to be coplanar. The number of coplanar rings determines the conjugation length: the longer the conjugation length, the lower the separation between adjacent energy levels, and the longer the absorption wavelength. The absorption band in the visible region is increasingly red-shifted as the conjugation length increases, and the effective conjugation length is calculated as the minimum number of bonded monomer units necessary to produce a saturation point of the red-shift. Determining the maximum effective conjugation length involves the synthesis of regioregular units of defined length. Deviation from coplanarity may be permanent, resulting from mislinkages during synthesis or especially bulky side chains; or temporary, resulting from changes in the environment or binding. A variety of environmental factors can cause the conjugated backbone to twist, reducing the conjugation length and causing an absorption band shift, including solvent, temperature, application of an electric field, and dissolved ions.

In the copolymer, at least two of the R groups ($R^1$, $R^2$, $R^3$, $R^4$, $R^5$, and $R^6$) in the first monomer may be replaced by covalent bonds to another monomer, and $R^7$ in the at least one second monomer may be replaced by covalent bonds to another monomer. In preferred embodiments, $R^1$ or $R^4$ are replaced by covalent bonds to another monomer.

In some embodiments where the compound of formula (II) is present, a mole ratio of the at least one second monomer to the first monomer may be from 10:1 to 1:10, 9:1 to 1:9, 8:1 to 1:8, 7:1 to 1:7, 6:1 to 1:6, 5:1 to 1:5, 4:1 to 1:4, or preferably from 4:1 to 1:1. The copolymer may contain one or both units shown here:

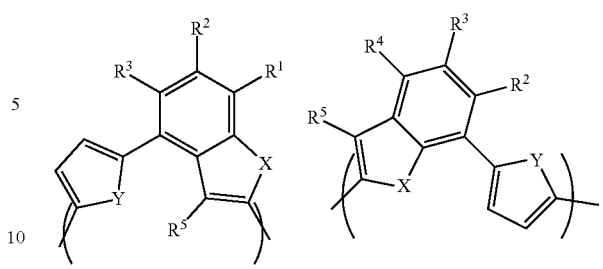

In some embodiments where the compound of formula (III) is present, a mole ratio of the at least one second monomer to the first monomer may be from 10:1 to 1:10, 9:1 to 1:9, 8:1 to 1:8, 7:1 to 1:7, 6:1 to 1:6, 5:1 to 1:5, 4:1 to 1:4, or preferably from 4:1 to 1:1. In some embodiments where both the compound of formula (II) and (III) are present, a mole ratio of the at least one second monomer to the first monomer may be from 10:1 to 1:10, 5:1 to 1:5, or preferably from 4:1 to 1:1; and a mole ratio of the compound of formula (II) to the compound of formula (III) is in a range of 100:1 to 1:100, 50:1 to 1:50, 20:1 to 1:20, 10:1 to 1:10, 5:1 to 1:5, 3:1 to 1:3, or 2:1 to 1:2.

Figure 2A:
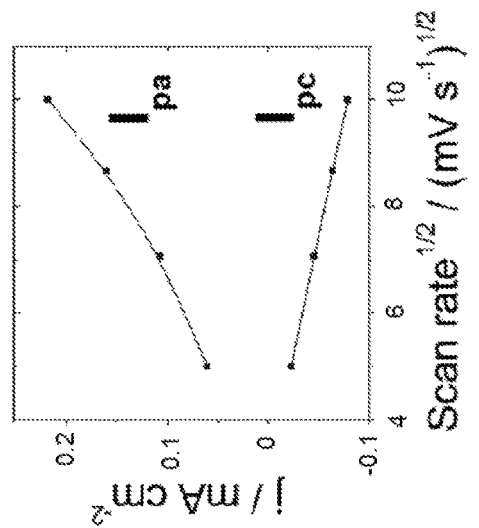
FIG. 2A shows the anodic polarization curve of a mixture of selenophene and thianaphthene monomers.

During copolymerization, two or more different structures are integrated into a polymer chain. Thus, properties of the copolymer may be different from the properties of respective homopolymers. Such properties may include electrical conductivity and redox stability. The copolymer forming from the preferred mole ratios of the monomers may exhibit a redox stability superior than that of the respective homopolymers. The term "redox stability" refers to the copolymer can be subjected to a plurality of voltage cycles and still maintain redox activity and resist irreversible degradation. A polybenzothiophene homopolymer shows irreversibility when subjected to a plurality of voltage cycles. For example, For example, a redox activity of the homopolymer may decrease by more than 50%, 70%, or 90% after the homopolymer is subjected to 10-100, 15-50, or 20-30 voltage cycles. On the contrary, the copolymer containing thianaphthene monomers may show redox stability/reversibility. For example, a redox activity of the copolymer may decrease by less than 15%, 10%, or 5% after the copolymer is subjected to 10-100, 15-50, or 20-30 voltage cycles (see, e.g., FIG. 2F). A scan rate for the cycling the voltage may be in a range of 10-120 mV/s, preferably 50-120 mV/s, more preferably 90-110 mV/s. A band gap energy value of the copolymer may be in a range of 1.8-2.3 eV, 1.85-2.2 eV, 1.9-2.1 eV, or 1.91-2.02 eV. An electrical conductivity of the copolymer may be in a range of 0.1-0.6 S/cm, 0.2-0.5 S/cm, or 0.3-0.4 S/cm. The electrical conductivity may be measured with a four-probe method at 20-30° C., 22-28° C., or 24-26° C.

In some embodiments, the copolymer consists essentially of the polymerization product of the first monomer and the at least one second monomer. That is, other components may be included in the copolymer as long as these components do not substantially change the redox properties and/or conductivity of the copolymer. In some embodiments, the copolymer may be free of reacted non-conjugated monomers and/or a non-conjugated polymeric block because these components adversely affect the electrical properties of the copolymer. A non-conjugated polymeric block may be a polymer consisting of bonds around which free rotation of the molecular backbone of the polymeric block itself can occur at or near room temperature. As is well known in the art, bonds that allow free rotation at or near room temperature includes C—C—C, C—O—C, C—S—C, Si—O—Si, and C—NR—C. Exemplary non-conjugated monomers include, without limitation, ethylene, propylene, and epoxide.

Another aspect of the disclosure relates to a method for making the copolymer. The method comprising: (i) mixing the first monomer and the at least one second monomer in a solution comprising a solvent and an electrolyte in the presence of a working electrode, a counter electrode, and a reference electrode; and (ii) applying a potential to the resulting solution thereby polymerizing the monomers.

In the disclosed method, the counter electrode, along with the working electrode, provides a circuit over which the potential is applied. The counter electrode may be made of an electrochemically inert material that does not react with the solvent, and/or monomers, and conducts well. The counter electrode of the present disclosure may be fabricated from a conducting or semiconducting material such as platinum, gold, or carbon. Preferably, the counter electrode is a platinum wire.

The working electrode is the electrode in an electrochemical system on which the copolymerization is occurring. The working electrode may be fabricated from a conducting or semiconducting material such as mercury, platinum, gold, silver, or carbon (e.g., glassy carbon or pyrolytic carbon). The working electrode may be a platinum disc electrode, an ultramicroelectrode, a rotating disk electrode, a rotating ring-disk electrode, a hanging mercury drop electrode, or a dropping mercury electrode. The working electrode may have an area in a range of 0.05-1 $cm^2$, 0.08-0.5 $cm^2$, or 0.1-0.2 $cm^2$.

The reference electrode provides a stable and well-known electrode potential, against which the potential of the working electrode is measured. The potential of the reference electrode in the electrochemical instrument of the present disclosure is defined as zero ("0"). When the potential is negative, the potential of the working electrode is lower than that of the reference electrode. When the potential is positive, the potential of the working electrode is higher than that of the reference electrode. In one embodiment, the reference electrode is an Ag/AgCl reference electrode. In another embodiment, the reference electrode is a hydrogen electrode. In another embodiment, the reference electrode is a copper-copper (II) sulfate electrode. In still another embodiment, the reference electrode is a palladium-hydrogen electrode. In a preferred embodiment, the reference electrode is a saturated calomel electrode.

The disclosed method may be performed with the electrode system placed in an undivided electrochemical cell, i.e., the working electrode and the counter electrode are placed in a single electrochemical cell compartment containing the solution.

In some embodiments, the method may be performed in a divided electrochemical cell, with the counter electrode in a first cell compartment and the working electrode in a second cell compartment, and with each cell compartment containing the aqueous solution. The cell compartment of the counter electrode is separated from the cell compartment of the working electrode with a porous separator that permits the diffusion of the electrolyte while restricting the flow of the products and reactants. The porous separator may be of porous paper, rubber, glass (e.g. a porous glass frit), porcelain, polyvinylchloride, polyester, polytetrafluoroethene, polypropylene, etc. This arrangement may prevent any byproducts generated at the counter electrode from contaminating the copolymer produced at the working electrode.

The method may be performed at a temperature of 4-50° C., preferably 10-40° C., more preferably 15-30° C., more preferably 20-25° C. A concentration of the electrolyte in the solution may be in a range of 0.01-1 M, 0.05-0.5 M, or 0.1-0.3 M.

The electrolyte in the aqueous solution may be any electrolyte that does not undergo chemical reaction across the potential range used for the electrochemical synthesis of the copolymer. Further, the electrolyte may not be consumed during electrochemical synthesis.

The electrolyte may contain a cation which is tetraethylammonium, tetrabutylammonium, tetraphenylphosphonium, or 1-methyl-3-ethyl imidazolium. The electrolyte may contain an anion which is perchlorate, acetate, benzoate, iodide, chloride, bromide, tetrafluroborate, hexafluorophosphate, tetraphenylborate, tetrakis(pentafluorophenyl)borate, triflate, bis((trifluoromethyl)-sulfonyl)imide, or bis-oxalatoborate. The cation and the anion may be considered separately as both species are generally stable. The cation and anion may be mixed and matched to produce the desired result. Preferably, the electrolyte is tetrabutylammonium tetrafluoroborate.

As used herein, the term "solvent" includes, but is not limited to, water (e.g. tap water, distilled water, doubly distilled water, deionized water, deionized distilled water) and organic solvents. The water may have a conductivity of less than 10 μS·cm−1, less than 5 μS·cm−1, or less than 1 μS·cm−1 at 20-30° C.; and/or a resistivity greater than 0.1 MΩ·cm, greater than 1 MΩ·cm, greater than 5 MΩ·cm, or greater than 10 MΩ·cm at 20-30° C.; and/or a total solid concentration less than 5 mg/kg, less than 1 mg/kg, or less than 0.5 mg/kg; and/or a total organic carbon concentration less than 1000 μg/L, less than 200 μg/L, or less than 50 μg/L.

Exemplary organic solvents include ethers (e.g. diethyl ether, dibutyl ether, tetrahydrofuran, 1,4-dioxane, tetrahydropyran, t-butyl methyl ether, cyclopentyl methyl ether, di-iso-propyl ether), alcohols (e.g., methanol, ethanol, trifluoroethanol, n-propanol, i-propanol, n-butanol, i-butanol, t-butanol, n-pentanol, i-pentanol, 2-methyl-2-butanol, 2-trifluoromethyl-2-propanol, 2,3-dimethyl-2-butanol,3-pentanol, 3-methyl-3-pentanol, 2-methyl-3-pentanol, 2-methyl-2-pentanol, 2,3-dimethyl-3-pentanol, 3-ethyl-3-pentanol, 2-methyl-2-hexanol, 3-hexanol, cyclopropylmethanol, cyclopropanol, cyclobutanol, cyclopentanol, cyclohexanol), glycol ethers (e.g. 1,2-dimethoxyethane, diglyme, triglyme), alkyl methyl sulfoxide (e.g., dimethyl sulfoxide, decylmethyl sulfoxide, tetradecylmethyl sulfoxide), ketone (e.g., acetone, butanone), chlorinated solvents (dichloromethane, chloroform, carbon tetrachloride, perchloroethylene (tetrachloroethylene), 1,1,2,2-tetrachloroethane, 1,1,2-trichloroethane, trichloroethylene, methyl chloroform (1,1,1-trichloroethane), 1,2,3-trichloropropane, ethylene dichloride, 1,2-dichloropropane (propylene dichloride), 1,2-dichloroethylene, 1,1-dichloroethane, chlorobenzene), an amide/lactam (e.g. dimethylformamide, dimethylacetamide, pyrrolidone, N-methyl-2-pyrrolidone, N-(2-hydroxyethyl) pyrrolidone), a nitrile (acetonitrile, propionitrile, butyronitrile, benzonitrile), a carbonate (ethylene carbonate, propylene carbonate), a lactone (γ-valerolactone, γ-butyrolactone), trifluorotoluene, and sulfolane.

The solvents may be used singularly or as a mixed solvent. Preferably, the solvent is a nitrile because it offers a favorable combination of good organic solvating power from the hydrocarbon character, and high polarity from the polar nitrile group. The nitrile group is not easily oxidized or reduced. The nitrile solvent is not strongly acidic or basic, which gives it excellent stability under both oxidizing and reducing conductions in electrochemical cells. In further preferred embodiments, the solvent is acetonitrile.

The solution may be deaerated by passing a stream of dry inert gas (e.g., helium, argon, and/or nitrogen) through the solution for 1-20 minutes, 5-15 minutes, or 8-12 minutes. Alternatively, a freeze-pump-thaw cycle may be used. In the process of electropolymerization, a slight over-pressure of the dry inert gas may be maintained during these studies to minimize oxygen in the atmosphere interacting with and/or dissolving in the solution. For example, the pressure may be no more than 1.01 atm, 1.05 atm, or 1.1 atm.

The potential may be in a range of 1.40-1.60 V, 1.45-1.55 V, or about 1.45 V, about 1.50 V, or about 1.55 V. The potential may be applied for an effective duration of 0.5-10 minutes, 1-5 minutes, or 2-3 minutes for forming the copolymer. The applied potential may be constant for the effective duration. In some embodiment, the applied potential varies up to 105%, 110%, 115% of the initial potential, and the method may still function as intended. For at least a part of the effective duration, the solution may be agitated by an agitator, a vortexer, a rotary shaker, a magnetic stirrer, a centrifugal mixer, or an overhead stirrer. In another embodiment, the solution is left to stand (i.e. not stirred). In one embodiment, the solution is sonicated in an ultrasonic bath or with an ultrasonic probe. The ultrasonic frequency may be in the range of 20-120 kHz, 40-100 kHz, or 60-90 kHz.

During the application of the potential, the monomers are electropolymerized through the electrooxidation of the monomers on the charged surface of the working electrode, forming a polymeric film covering the charged surface of the working electrode. A thickness of the polymeric film comprising the copolymer may vary in the range of 1-400 nm, or 10-350 nm, or 50-300 nm, or 80-250 nm, or 100-200 nm, or 120-150 nm.

The copolymer described herein may be useful for microelectronics applications, electrocatalysis, fuel cell electrodes, light emitting diodes, biosensor microelectrodes, reinforced composites, and biomedical applications. For example, the copolymer may be used as a supercapacitor, a light emitting diode (LED), a solar cell, a field effect transistor (FET), or a biosensor. Supercapacitors, due to their capability to deliver during high momentary periods, are presently using as the electrical energy storage devices. They have technical and economic advantages in electrical appliances, such as power supplies, protection of computer memory, microchip, fuel cells and batteries. Supercapacitors are unique devices exhibiting 20-200 times greater capacitance than batteries and conventional capacitor. Light emitting diodes (LEDs) are used in applications as diverse as replacements for automative lighting, such as brake lamps, turn signals and automative traffic signals. LEDs are also used in remote control units of many commercial products including DVD players, televisions and other domestic appliances. A solar cell is an electric device that converts the energy of sunlight directly into electricity by the photovoltaic effect. In standalone systems, batteries are used to store the energy that is not needed immediately. Solar panels can be used to power or recharge portable devices. The field effect transistor (FET) uses in electric field to control the shape and thus the conductivity of a channel of one type of charge carrier in a semiconductor material. FET technology is the basis for modern digital integrated circuits. A biosensor is an analytical device which converts a biological response into an electrical signal. The response of the biosensor is determined by the biocatalytic membrane which accomplishes the conversion of reactant product.

Having generally described this invention, a further understanding can be obtained by reference to certain specific examples which are provided herein for purposes of illustration only and are not intended to be limiting unless otherwise specified.

Example 1 Experimental Methods and Materials

Selenophene (Se) (TCI, 98%) and thianaphthene (ThN) (Sigma-Aldrich, 98%) were distilled under nitrogen just prior to use. Tetrabutylammonium tetrafluoroborate (TBATFB) (Acros, 98%) was dried under vacuum at 80° C. for 24 h. Acetonitrile (ACN) (Merck, anhydrous, less than 10 ppm $H_2O$) was used without further purification.

The electropolymerization between selenophene and thianaphthene was carried out in a one-compartment three-electrode cell by using a 150 potentiostat-galvanostat (Bio-Logic) under computer control (EC-Lab) software. A platinum disc electrode (area 0.1 $cm^2$) was used as working electrode for electrosynthesis and cyclic voltammetry (CV) measurements, while a platinum wire was used as counter electrode. Saturated calomel electrode (SCE) was used as the reference electrode. The process was carried out potentiostatically for a time of 2 min, while the polymerization solvent was acetonitrile containing a 0.1 mol $L^{-1}$ TBATFB as a supporting electrolyte. After polymerization, the polymer film was washed with acetonitrile to remove any traces of monomers and oligomers. The CVs of the obtained polymers were taken in a monomer-free solution. All solutions were deaerated by a dry $N_2$ stream for 10 min before the subsequent studies and a slight $N_2$ over-pressure was maintained during these studies.

The in situ UV-Vis-spectra were recorded with the homopolymer and copolymer films deposited on a modified optically transparent ITO glass electrode (area 3 $cm^2$) in the supporting electrolyte solution. A Shimadzu UV 1800-PC instrument with a resolution of 1 nm was used. The spectra were recorded at increasingly positive electrode potentials and the CVs were used to determine the suitable range of electrode potentials. The absorption maximum $\lambda_{1max}$ assigned to the $\pi \to \pi^*$ transition was measured with the polymer in its neutral state. The absorption maximum $\lambda_{2max}$ attributed to an intraband transition from the valence band into the upper bipolaron band of the polymer was measured with the polymer in its oxidized form.

Conductivity measurements were taken with a four-probe technique (SES Instruments Pvt. Ltd.). The polymer films were deposited onto a platinum sheet electrode. After p-doping (i.e., electrochemically oxidizing) the polymer film to desired potentials (up to E vs. SCE=1.50 V) in a monomer-free solution, the deposited films were scraped off from the electrode surface, dried and then pressed to discs with relatively thin thickness.

For FTIR spectroscopy measurements, the films were scraped off from the electrode surface and dried. The spectra of the polymer films in KBr-discs were recorded on Shimadzu FT-IR 8400 spectrometer at 2 $cm^{-1}$ resolution.

Example 2 Electropolymerization and Electrochemical Behavior

FIG. 1A shows cyclic voltammograms (CV) recorded at the platinum electrode in ACN and 0.1 mol $L^{-1}$ TBATFB (non-aqueous solution) at a scan rate dE/dt=100 mV $s^{-1}$. The monomer-free solution (i.e., background) was electrochemically silent in the whole potential range (0.0<$E_{SCE}$<2.0 V).

Figure 1B:
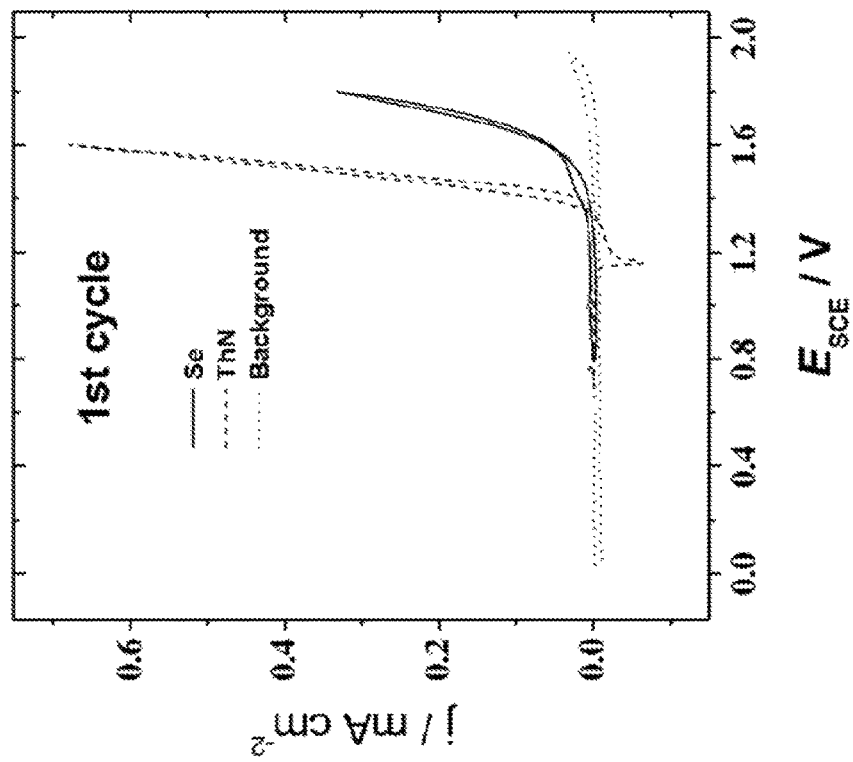
FIG. 1B is an overlay of cyclic voltammograms (CV) of polyselenophene (PSe) at different scan rates.
Figure 1C:
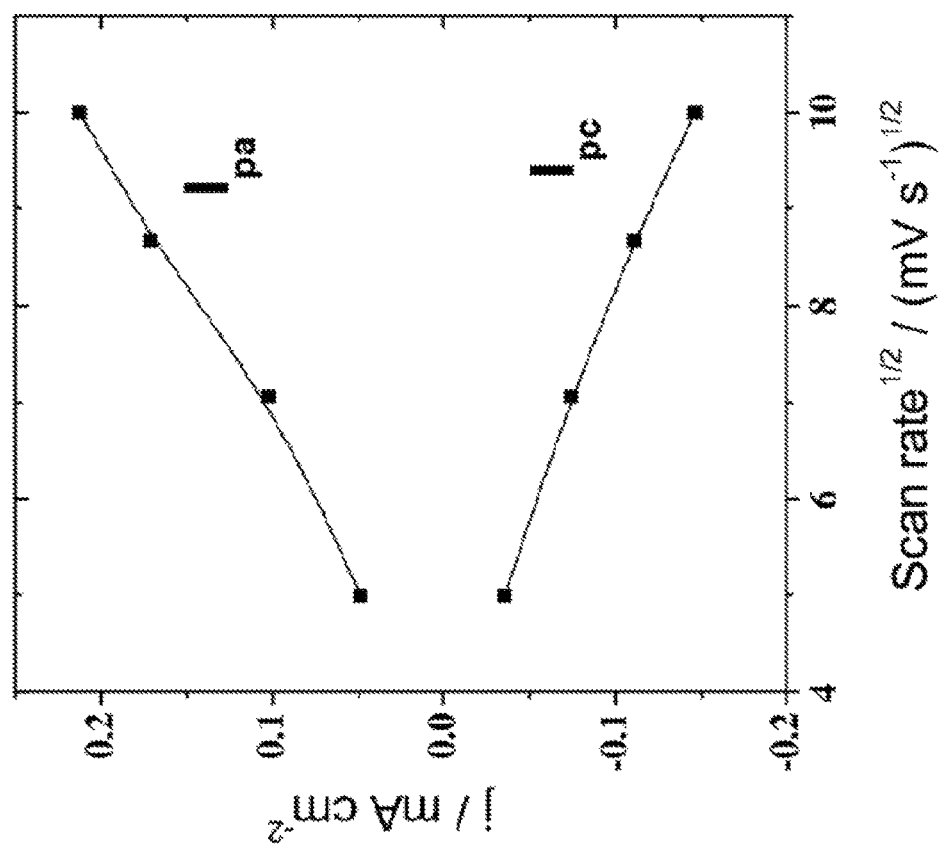
FIG. 1C shows the dependence of redox currents on the square root of scan rate for PSe.
Figure 1E:
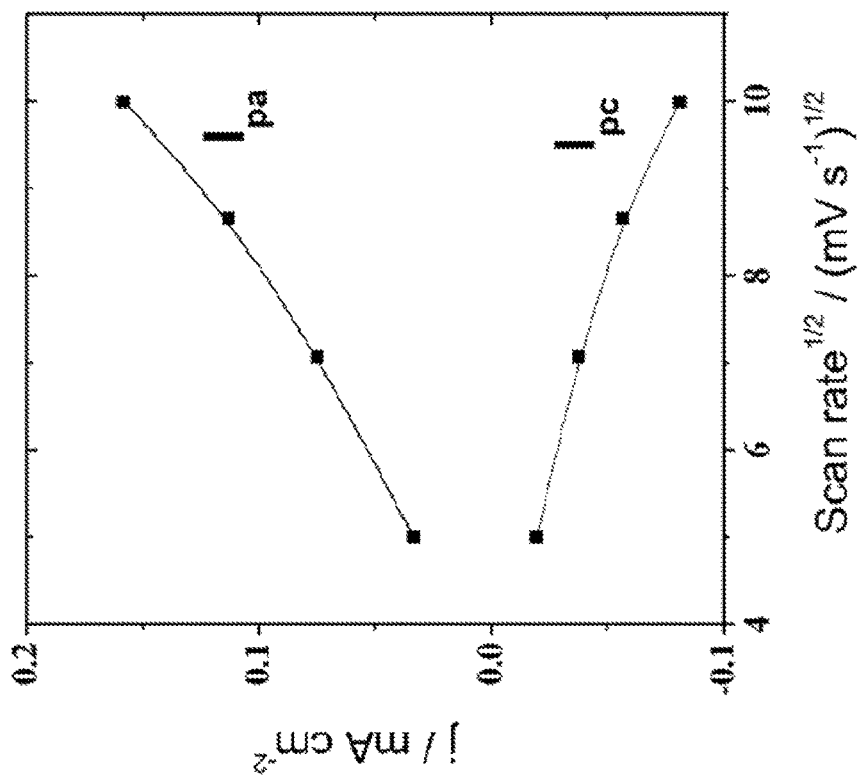
FIG. 1E shows the dependence of redox currents on the square root of scan rate for PThN.
Figure 1D:
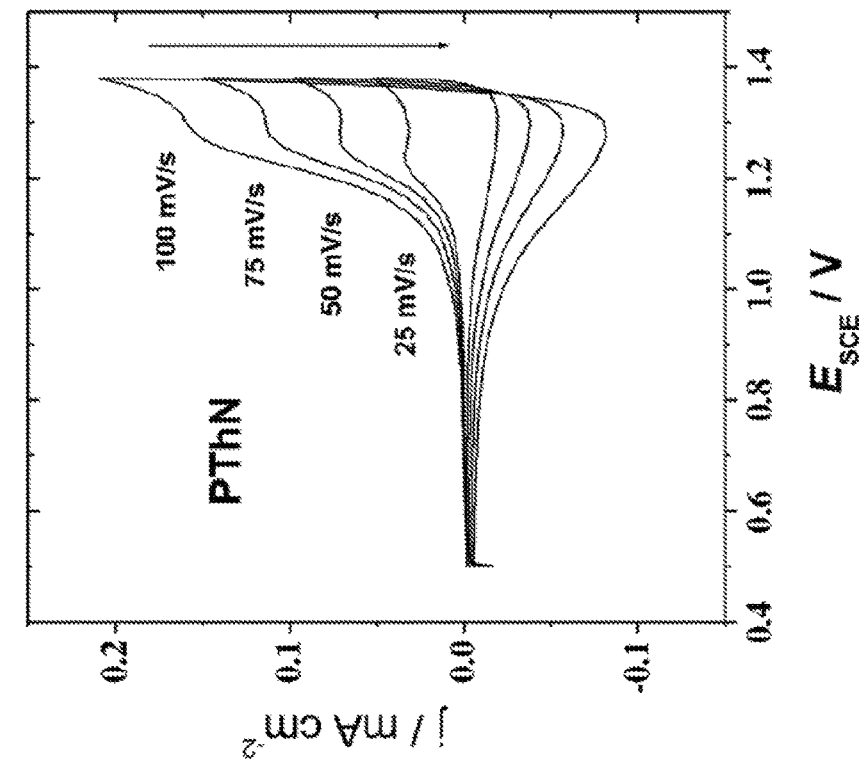
FIG. 1D is an overlay of CV of polybenzothiophene (PThN) at different scan rates.

The initial CVs of monomers (0.1 mol $L^{-1}$) were also recorded in the same potential range at dE/dt=100 mVs$^{-1}$. In the positive direction scan, there was a steep current increase at different potentials for monomers. The oxidation of selenophene was initiated at E vs. SCE=1.60 V, whereas the threshold potential needed to sustain growth of polythianaphthene (PThN) was started at E vs. SCE=1.40 V (which was similar to the data reported in literature). In the negative direction scan, trace crossing occurred at about $E_{SCE}$=1.43 and 1.16 V for Se and ThN, respectively. The crossing was assigned to the reaction between oligomeric species and monomer molecules at the solution/metal interface. The homopolymers were formed by applying the polymerization potential (1.60 V for Se and 1.40 V for ThN) for a period of 2 min. The CVs of the homopolymers in monomer-free solution with different scan rates are shown in FIGS. 1B and 1D. Polyselenophene had a broad redox peak couple at E vs. SCE=1.06 V and E vs. SCE=0.89 V caused by polymer oxidation and reduction. This electrochemical behavior was comparable to the results reported before. For PThN, the corresponding peaks were located at E vs. SCE=1.28 V and 1.26 V, with a difference of 0.02 V, indicating a high reversibility of the associated redox processes. Moreover, the redox currents were apparently dependent on the square root of the scan rate which indicates that the electrochemical process was diffusion-controlled. FIGS. 1C and 1E show the dependence of the redox currents on the square root of the scan rate.

The small difference between the threshold potentials of the two monomers implied a possibility of copolymerization. Current-potential curves were obtained for a solution containing 0.1 mol $L^{-1}$ selenophene and 0.1 mol $L^{-1}$ thianaphthene in the non-aqueous polymerization solution (see FIG. 2A). The onset potential of the mixture Se—ThN ($E_{SCE}$=1.45-1.47 V) was located between that for the respective monomers, suggesting that oxidation of both monomers was possible and the copolymer chains may accordingly be composed of selenophene and thianaphthene repeating units. In addition, the anodic current of the mixture was higher than those for the respective monomers at same concentration and scan rate. This implied that the copolymer resulting from the Se—ThN mixture had higher electrochemical activity (e.g., enhanced conductivity and redox stability).

Figure 2B:
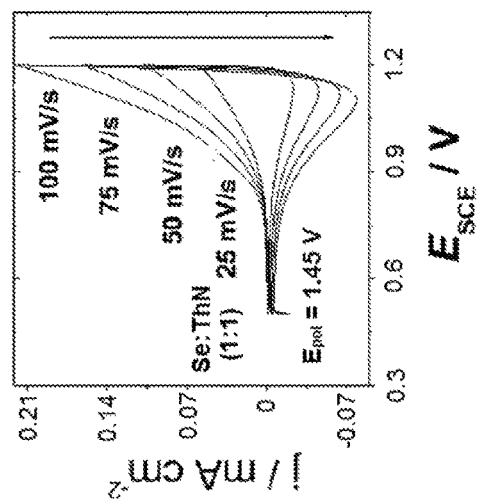
FIG. 2B is an overlay of CV of the copolymer (obtained at E vs. SCE=1.45 V) with 1:1 monomer ratio at different scan rates.
Figure 2C:
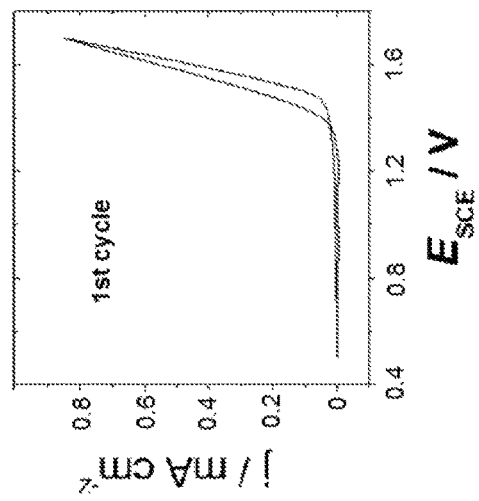
FIG. 2C shows the dependence of redox currents on the square root of scan rate for the copolymer.
Figures 2D, 2E:
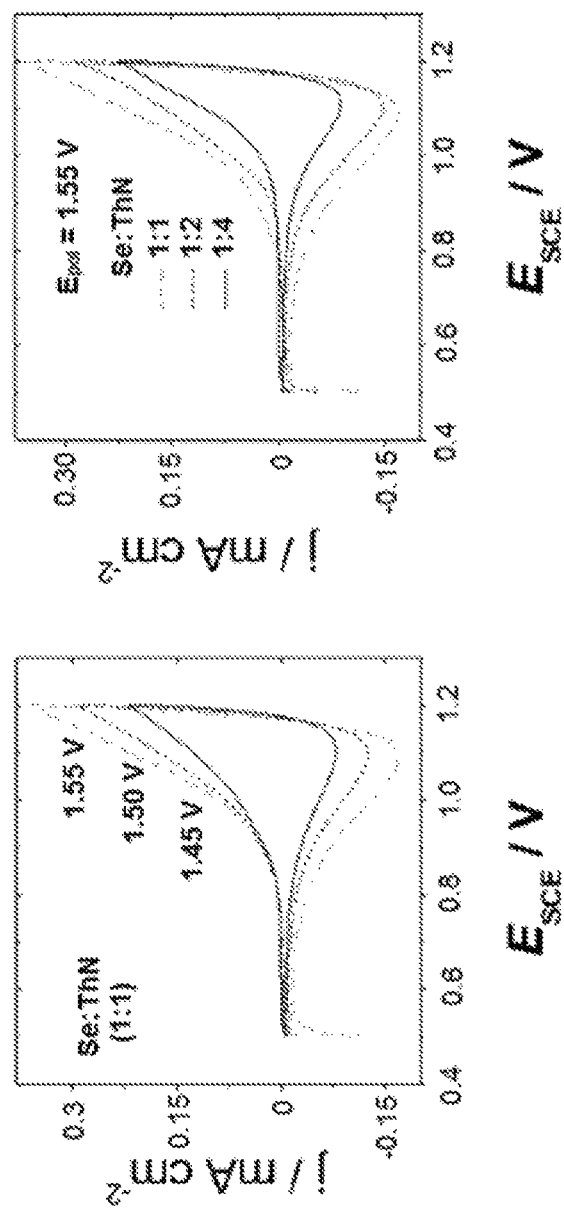
FIG. 2D is an overlay of CV of the copolymer obtained at different polymerization potentials.
FIG. 2E is an overlay of CV of the copolymer (obtained at E vs. SCE=1.55 V) with different monomer ratios.
Figure 2F:
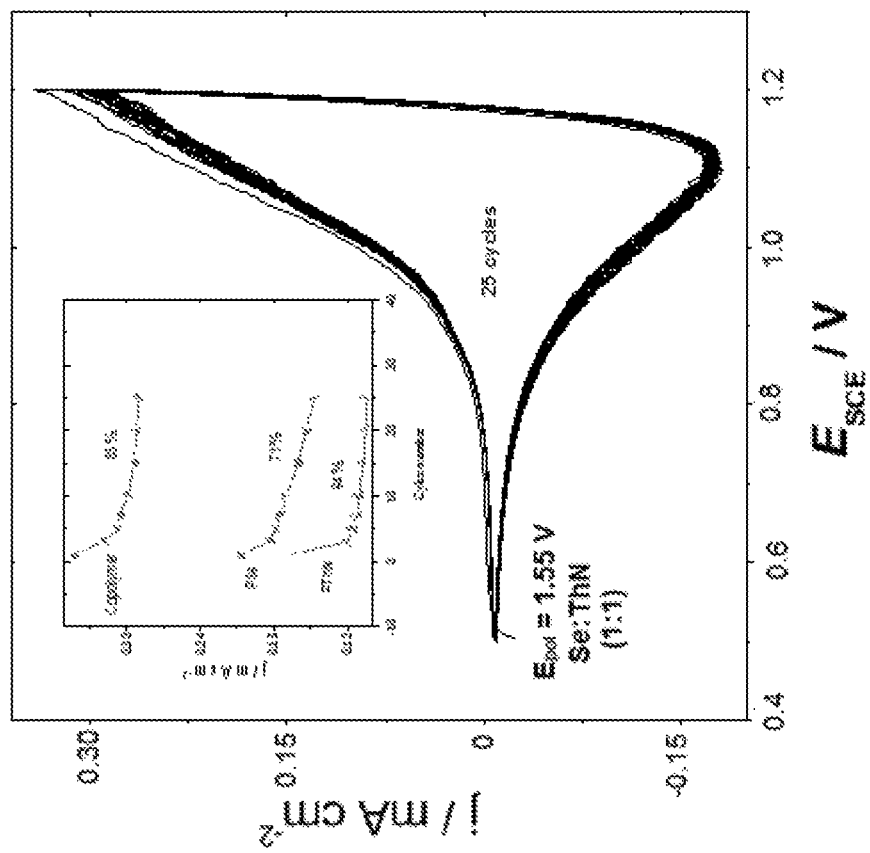
FIG. 2F shows the redox stability of copolymer obtained at E vs. SCE=1.55 V with 1:1 monomer ratio. $dE/dt=100$ mV $s^{-1}$.

Copolymerization was performed at constant electrode potentials. FIG. 2B shows characteristic CVs of a copolymer film obtained from solution containing 0.1 mol $L^{-1}$ selenophene and 0.1 mol $L^{-1}$ thianaphthene copolymerized at E vs. SCE=1.45 V. The obtained film revealed p-doping/undoping waves in the +0.5 to +1.2 V region. The obtained copolymers displayed asymmetric voltammetric waves at positive potentials, which was characteristic behavior for most conducting polymers. Formal p-doping potentials were difficult to estimate because of the broadness of the waves and the lack of clear doping peaks. The potential at half of the cathodic peak current ($E_{p/2}$), on the cathodic side of the undoping wave, provided a good estimate of the lowest observable formal potential (K. Loganathan, P. G. Pickup, Electrochim. Acta 52 (2007) 4685; and K. Loganathan, F. Huang, P. G. Pickup, Electrochim. Acta 52 (2006) 15, each incorporated herein by reference in their entirety). The appearance of one redox wave implied uniform redox properties. A maximum difference of 0.05 V indicated a high reversibility of the associated redox processes. In addition, the effect of scan rates on the electrochemical behavior of the obtained copolymer was studied. The current densities were dependent on the square root of the scan rate (see FIG. 2C) which reveals that the electrochemical reaction was diffusion-controlled as well.

Electrochemical copolymerization at different polymerization potentials and different monomer feed ratios were investigated. The results showed that p-doping/undoping waves of the copolymers shifted to lower values with increasing polymerization potential of the copolymer films. Additionally, when the monomer feed ratio of ThN was increased in the polymerization solution, a positive shift of the redox potentials of the copolymers was observed. This observation implied that more ThN monomers were added to the copolymer film when its concentration increased. The data also indicated that keeping the polymerization potential of the copolymers near the threshold potential of selenophene may result in selenophene-based copolymers and vice versa. Apparently, the dependence of the electrochemical properties of the copolymers on the electropolymerization potential and monomer feed ratio reflected the composition and perhaps the structure of the copolymers. The obtained copolymer films showed long-term stability of redox activity after cycling in acetonitrile (see FIG. 2F). The retention of redox activity of the copolymer film after 25 cyclic voltammetry cycles at a scan rate of 100 mV s$^{-1}$ in acetonitrile was almost 85% (in terms of current density), which proved that copolymerization of the two monomers enhanced the stability of film in regard to overoxidation and irreversible degradation. The obtained copolymer films cycled repeatedly between the neutral and oxidized states with a slight decrease in its electroactivity. The peak separation of the redox couple of the copolymer was around 0.03 V which led to the conclusion that the redox process was reversible (i.e., fast). On the contrary, PThN showed irreversibility during cycling. The current densities of PThN films decreased significantly when the CV scan continues. This observation indicated that neutral PThN was soluble in electrolyte solution and the amount of polymer film on the electrode surface decreased steadily. Moreover, degradation occurred along with the overoxidation of the polymer chains upon redox cycling. This behavior was a common feature and was usually observed in the electrochemistry of intrinsically conducting polymers. Polyselenophene films can be cycled repeatedly between the conducting and insulating states with slight decrease in electroactivity. The retention of the redox activity of after 100 times cycling in dry acetonitrile is about 30% (in terms of peak current), indicating the coexistence of both long and short conjugation lengths in the polymer chains. Additionally the stability of the homopolymer film declines noticeably beyond 25 cycles and lost around 50% of its activity.

Example 3 In Situ UV-Vis Spectroscopy Studies

Figure 3B:
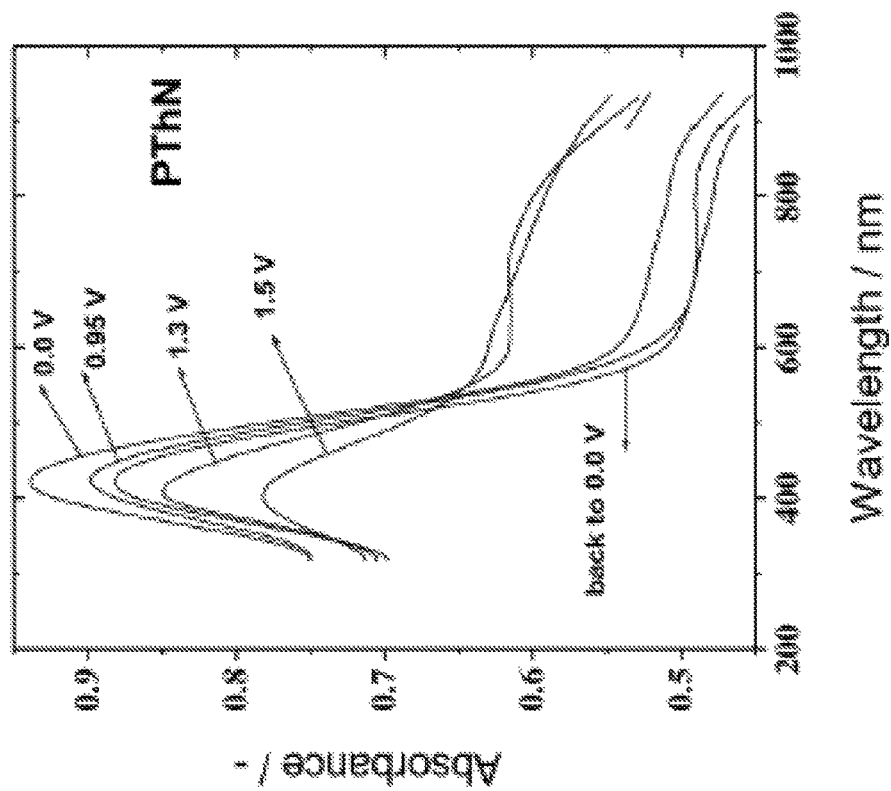
FIG. 3B shows the in situ UV-Vis spectra of polybenzothiophene recorded at different applied potentials in a solution of acetonitrile and 0.1 M TBATFB.
Figure 3A:
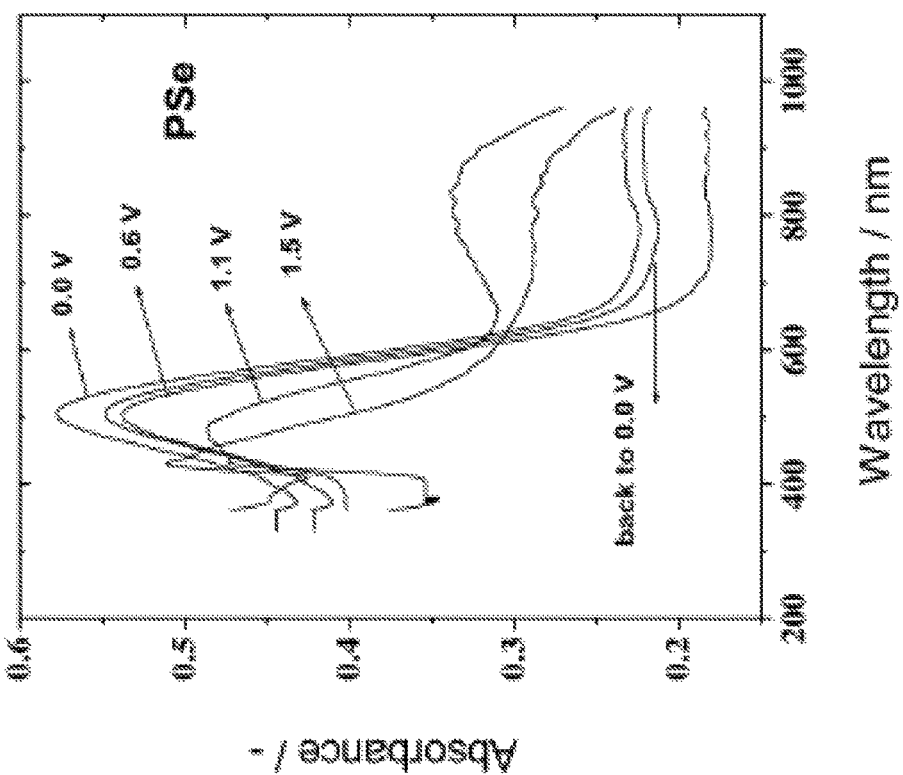
FIG. 3A shows the in situ UV-Vis spectra of PSe recorded at different applied potentials in a solution of acetonitrile and 0.1 M tetrabutylammonium tetrafluoroborate (TBATFB).

FIG. 3A shows the in situ UV-Vis of selenophene homopolymer during electrochemical oxidation. Two main absorption bands were located around 510 and 820 nm. The first broad band in the neutral state (2.43 eV) was attributed to the $\pi \rightarrow \pi^*$ transition. The width of this absorption band revealed the coexistence of both long and short effective conjugation lengths in the polymer film. The large family of p-conjugated polymers and their homologous oligomers share a common property for the optical absorption: the excitation energy E(n) of the lowest excited state generally depends on the number N of repeat units. The length of the oligomer with $n_{eff}$ repeat units that marks the onset of the saturation defines an effective conjugation length in this context. The conjugated length of polyselenophene is between 6 to 50 monomer units. These values are still within the effective conjugation length described above.

In the positive direction scan, a very broad characteristic band appeared with the peak maximum shifting into NIR upon further oxidation. This optical transition with $\lambda_{2max}$ from the valence band into the higher bipolaron band (the upper subgap state) was located at 1.51 eV above the valence band. According to the zero-order approximation the band gap energy of polyselenophene ($E_g$), a direct interband transition was estimated from the absorption edge (~652 nm) of the spectrum and found to be about 1.90 eV (S. Glenis, D. S. Ginley, A. J. Frank, J. Appl. Phys. 62 (1987) 190, incorporated herein by reference in its entirety). This value was close to the reported value in literature (T. T. Ong, S. C. Ng, H. Chan, Polymer 44 (2003) 5597; N. Marcal, B. Laks, Int. J. Quantum Chem. 95 (2003) 230; and F. Alakhras, J. Braz. Chem. Soc. 27 (2016) 941, each incorporated herein by reference in their entirety).

Polythianaphthene (which has a band gap energy of 2.03 eV) showed a broad π→π* interband transition located around 420 nm (see FIG. 3B). Upon oxidation to 1.28 V, the peak height of the $\lambda_{1max}$ vanished and another broad absorption band $\lambda_{2max}$ appeared around 800 nm (1.55 eV). The longer wavelength indicated longer polymer sequences with broad molar mass distribution. These spectral changes could be attributed to the formation of polaron/bipolaron energy states upon electrochemical doping. In the band gap, two bipolaron energy states were formed and the upper one was located at 0.48 eV below the conduction band.

In situ UV-Vis spectra at different electrode potentials and with different monomer feed ratios in the polymerization solution were also examined (not shown). The copolymer films had characteristic spectra with a broad absorption band in their neutral state indicating that both long and short effective conjugated lengths containing selenophene and thianaphthene units were present in the copolymer chains. The conjugation length of polythianaphthene is around 2 to 3 repeated units whereas polyselenophene has 6 to 50 monomer units. The effective conjugation lengths of the copolymers are between those of homopolymers (4 to 30 repeated units).

The band gap energies of the investigated copolymers were between the band gap energies of the respective homopolymers.

Table 1 summarizes that by increasing the polymerization potential of the copolymers, a red shift of the absorption band in the neutral state was observed. Additionally, a higher concentration of thianaphthene in the polymerization solution led to a hypsochromic shift of the interband transition of the obtained copolymers.

TABLE 1

Absorption bands and band gaps of copolymers obtained at E vs. SCE = 1.45, 1.50 and 1.55 V from solutions containing different monomer feed ratio.

| Se/ThN mole ratio | Polymerization potential | $\lambda_{1max}$ nm | ev | $\lambda_{2max}$ nm | eV | Band gap nm | eV |
|---|---|---|---|---|---|---|---|
| 1:1 | 1.45 | 480 | 2.58 | 811 | 1.53 | 632 | 1.96 |
|  | 1.50 | 485 | 2.56 | 815 | 1.52 | 640 | 1.94 |
|  | 1.55 | 500 | 2.48 | 818 | 1.52 | 648 | 1.91 |
| 1:2 | 1.45 | 457 | 2.71 | 808 | 1.53 | 620 | 2.00 |
|  | 1.50 | 465 | 2.67 | 814 | 1.52 | 631 | 1.96 |
|  | 1.55 | 480 | 2.58 | 815 | 1.52 | 635 | 1.95 |
| 1:4 | 1.45 | 435 | 2.85 | 805 | 1.54 | 615 | 2.02 |
|  | 1.50 | 452 | 2.74 | 810 | 1.53 | 622 | 1.99 |
|  | 1.55 | 470 | 2.64 | 813 | 1.52 | 628 | 1.97 |

Figure 3D:
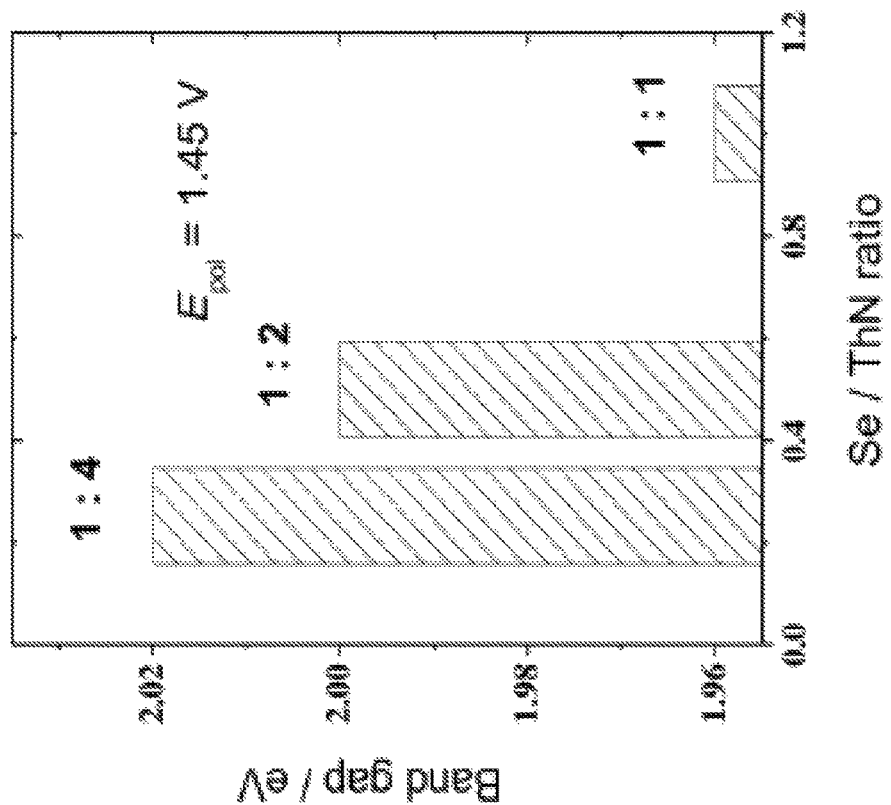
FIG. 3D shows the band gap energies of copolymers obtained at E vs. SCE=1.45 V with different monomer ratios.
Figure 3C:
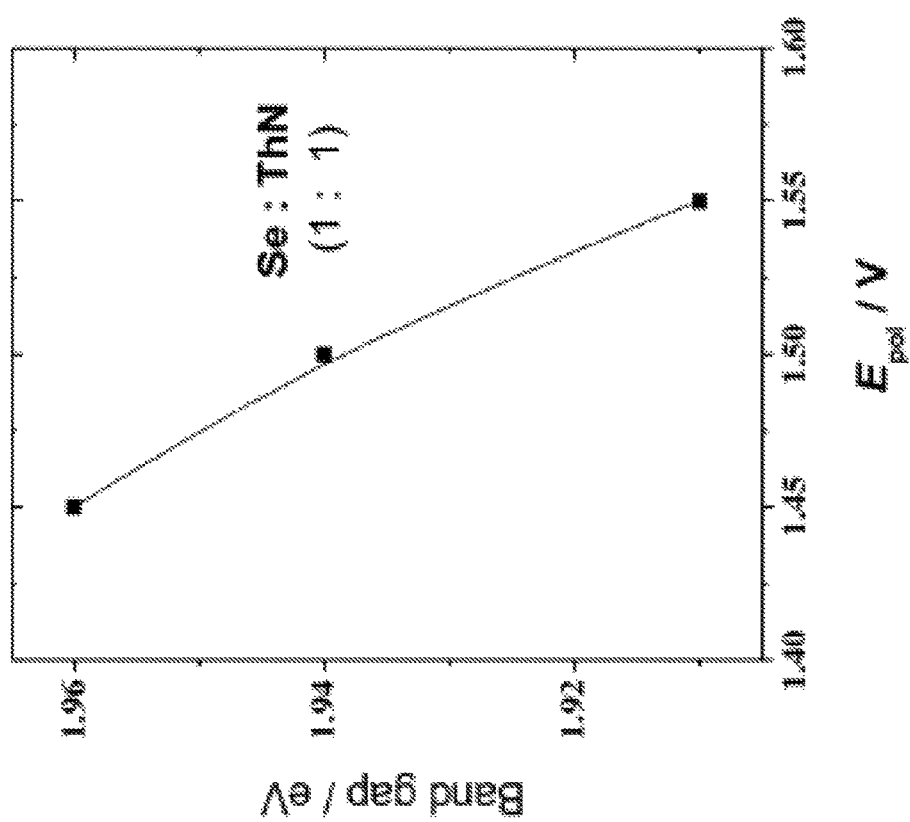
FIG. 3C shows the band gap energies of copolymers obtained at different polymerization potential with 1:1 monomer ratio.

FIGS. 3C and 3D point out that the polymer synthesized at E vs. SCE=1.55 V with 1:1 feed ratio may have a structure close to those of poly(selenophene)-based copolymer films while the film deposited at E vs. SCE=1.45 V with 1:4 feed ratio may be regarded as polythianaphthene-based material films. This assumption is based on the obtained results of band gap energies, conductivity measurements and electrochemical stability.

Example 4 Electrochemical Conductivity Studies

Figure 4B:
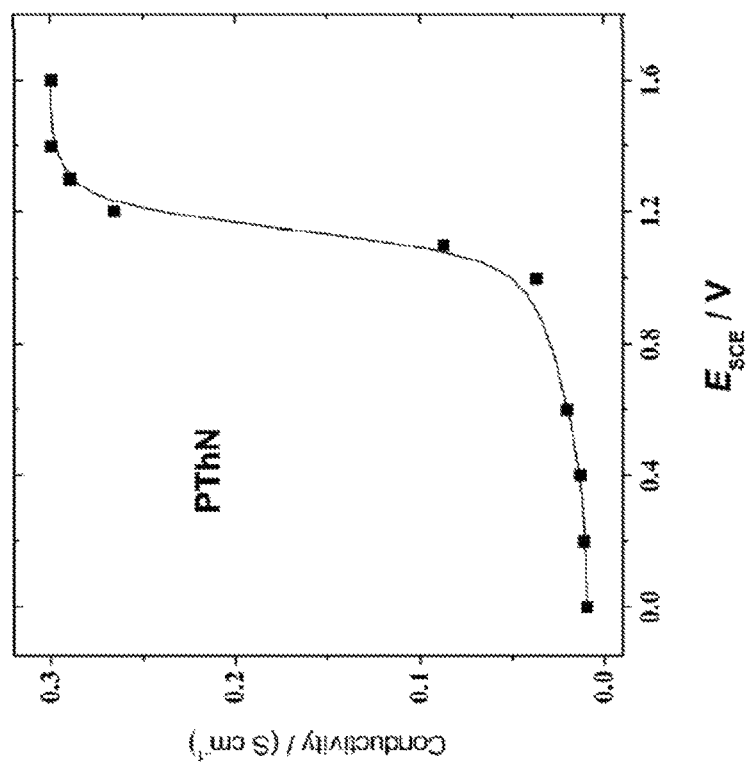
FIG. 4B shows the electrical conductivity of PThN.
Figure 4A:
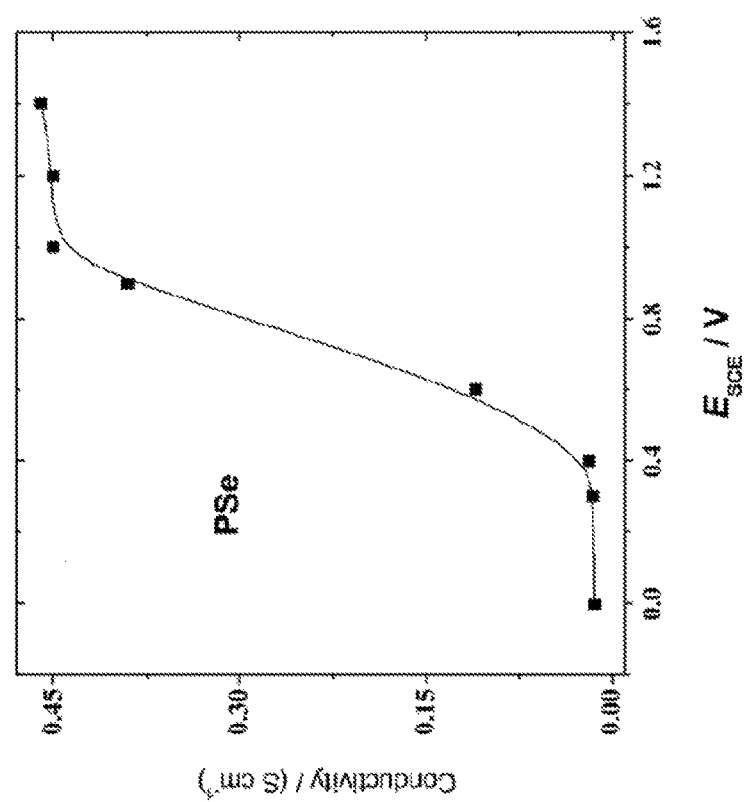
FIG. 4A shows the electrical conductivity of PSe.

Polyselenophene exhibited a particular conductivity change at room temperature (see FIG. 4A). In the positive direction scan, the conductivity remarkably increased 30 times and reached around $4.6 \times 10^{-1}$ Scm$^{-1}$. PThN films displayed the same behavior and upon p-doping the conductivity was about $3.0 \times 10^{-1}$ Scm$^{-1}$ (see FIG. 4B).

Electrical conductivity measurements at different polymerization potentials and different monomer feed ratios were performed. The copolymers showed a single change in the conductivity during oxidation (see FIG. 4C). In addition, the conductivity values of the obtained copolymer films were between those of homopolymers. This indicated that the oxidation of selenophene and thianaphthene monomers occurred and the copolymer chains may consequently be composed of both monomer units. Furthermore, the conductivity values were not the sum of conductivity values of the two homopolymers, thus implied the copolymer may be less likely a block copolymer. The copolymer prepared at E vs. SCE=1.55 V with 1:1 feed ratio may have a structure close to polyselenophene-based random copolymers while the film obtained at E vs. SCE=1.45 V with 1:4 feed ratio may be considered as polythianaphthene-based random copolymer.

Figure 4D:
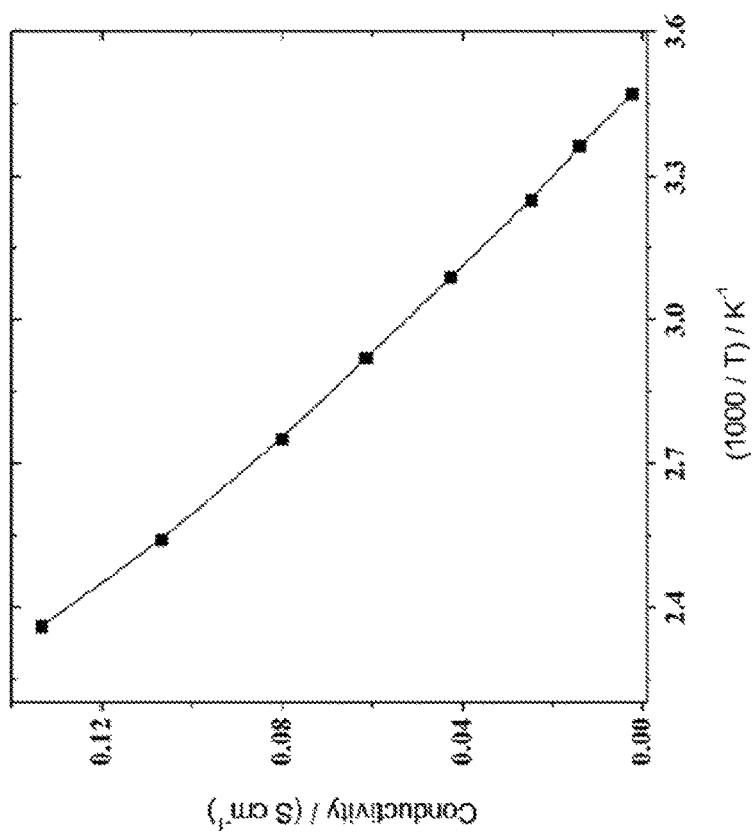
FIG. 4D shows the conductivity of PSe as a function of temperature.
Figure 4C:
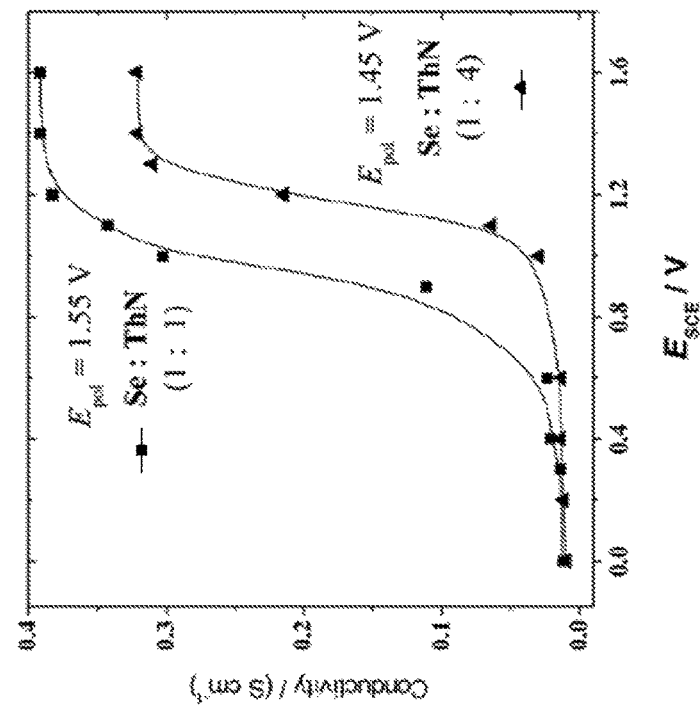
FIG. 4C shows the electrical conductivity of copolymers obtained at different polymerization potential and different monomer ratios.
Figure 4E:
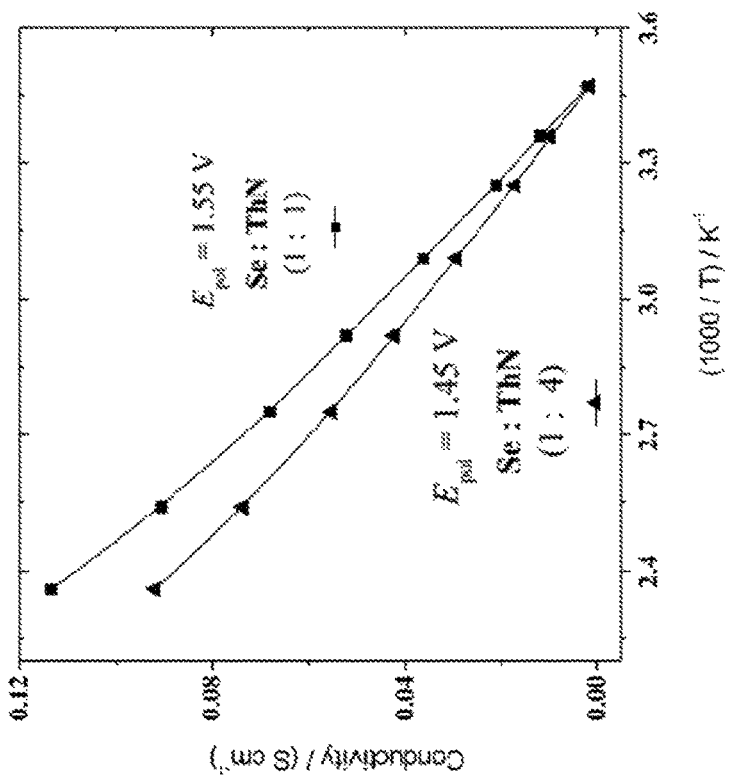
FIG. 4E shows the conductivity of PThN as a function of temperature.
Figure 4F:
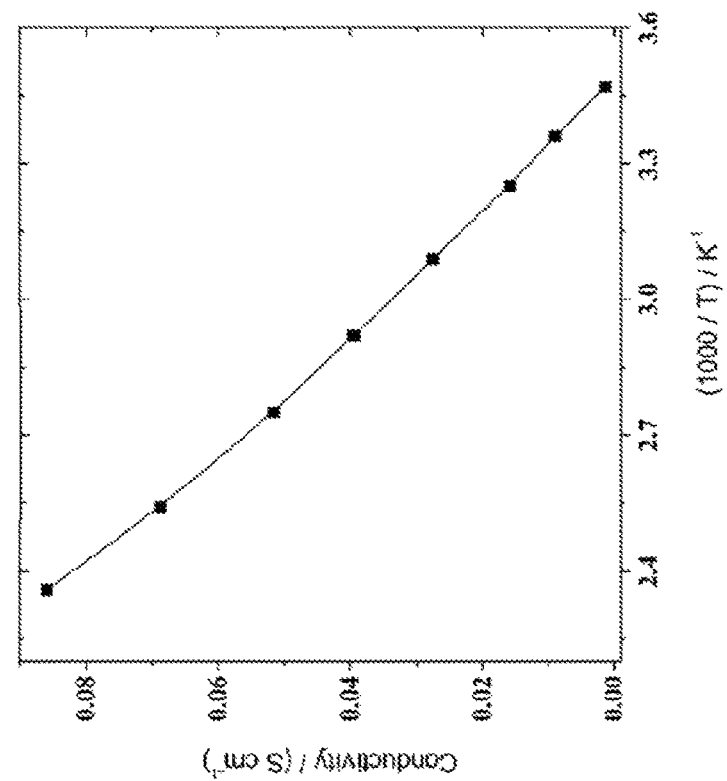
FIG. 4F shows the conductivity of copolymers as a function of temperature.

The effect of temperature on conductivity values of homo- and copolymer films was investigated (see FIGS. 4D, 4E, and 4F). The conductivity value increased with higher temperatures since the electrons may have obtained enough energy to move from the valence to the conducting band (R. Sugimoto, K. Yoshino, S. Inoue, K. Tsukagoshi, Jpn. J. Appl. Phys. 24 (1985) L425, incorporated herein by reference in its entirety).

Example 5 FTIR Studies of Homo- and Copolymer Films

Table 2 summarizes the FTIR data of the copolymer synthesized at E vs. SCE=1.45 V with 1:1 feed ratio; for comparison, the data of the respective homopolymers were included as well. The data of the homopolymers were comparable with the published data in literature. Important FTIR bands included: C=C symmetric and antisymmetric stretching vibration between 1350 and 1600 cm$^{-1}$; and absorption bands at ca. 690, 720, 760 and 820 cm$^{-1}$ related to C—H out-of-plane deformation implied the formation of 1,2,3-trisubstituted benzene rings and α-substituted fivemembered heterocyclic compounds. The intensities of the FTIR bands of the copolymers were the same as the intensities of the FTIR bands for the homopolymers. This indication could be regarded as a proof of copolymerization distinguishing itself from the simple addition of the spectra of pure homopolymers. Furthermore, the IR bands of the doped copolymer films were shifted to lower frequencies with respect to the freshly prepared ones. This energy change indicated bond weakening due to the removal of electron density from π-bonding orbitals due to the oxidation. The weak absorptions at ca. 1670-1700 cm$^{-1}$ corresponding to the C=O stretching vibration showed that some defects existed in the obtained materials.

TABLE 2

FTIR band assignments of PSe, PThN and a copolymer obtained at E vs. SCE = 1.45 V with 1:1 monomer ratio, all figures in wavenumbers (cm$^{-1}$).

| Mode | PSe | PThN | As-prepared copolymer |
|---|---|---|---|
| ν(C=C)ring | 1400-1600 | 1350-1530 | 1335-1560 |
| ν(C—C)ring | 1290 | 1230 | 1255 |
| δ(C—H) | 1020-1085 | 1080-1155 | 1060-1140 |
| γ(C—H) | 710-820 | 690-760 | 700-790 |
| ν(C=O) | 1670 | 1700 | 1685 |

ν, stretching;
δ, in-plane deformation;
γ, out-of-plane deformation.

The invention claimed is:

1. A copolymer, comprising a polymerization product of:
   a first monomer represented by formula (I); and
   a second monomer represented by formula (II);
   wherein a mole ratio of the second monomer to the first monomer is from 1:2 to 1:4, and formulae (I) and (II) are:

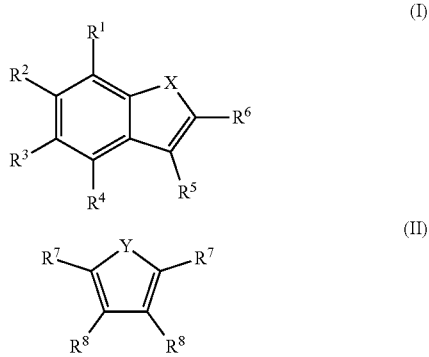

where X is sulfur, and Y is selenium;
$R^1$, $R^2$, $R^3$, $R^4$, are independently a hydrogen, a hydroxy, a thiol, a fluoro, a chloro, a bromo, an iodo, a nitro, a cyano, an amino, a carboxy, an optionally substituted alkyl, an optionally substituted cycloalkyl, an optionally substituted arylalkyl, an optionally substituted aryl, an optionally substituted alkanoyl, or an optionally substituted aroyl; and
$R^5$, $R^6$, and each of $R^7$ and $R^8$ are independently a hydrogen, a fluoro, a chloro, a bromo, an iodo, a nitro, a cyano, a carboxy, an optionally substituted alkyl, an optionally substituted cycloalkyl, an optionally substituted arylalkyl, an optionally substituted aryl, an optionally substituted alkanoyl, or an optionally substituted aroyl.

2. The copolymer of claim 1, wherein the mole ratio of the second monomer to the first monomer is 1:2.

3. The copolymer of claim 1, wherein the mole ratio of the second monomer to the first monomer is 1:4.

4. The copolymer of claim 1, wherein the first monomer is:

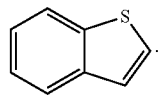

5. The copolymer of claim 1, wherein the compound represented by formula (II) is

6. The copolymer of claim 1, wherein a redox activity of the copolymer decreases by less than 15% after the copolymer is subjected to 20-30 voltage cycles.

7. The copolymer of claim 1, wherein the copolymer is free of reacted non-conjugated monomers.

8. The copolymer of claim 1, wherein the copolymer is free of a non-conjugated polymeric block.

9. The copolymer of claim 1, wherein a band gap energy value of the copolymer is in a range of 1.9-2.1 eV.

10. The copolymer of claim 1, wherein an electrical conductivity of the copolymer is in a range of 0.3-0.4 S/cm.

11. A method for making the copolymer of claim 1, the method comprising:
    mixing the first monomer and the second monomer in a solution comprising a solvent and an electrolyte in the presence of a working electrode, a counter electrode, and a reference electrode; and
    applying a potential to the resulting solution thereby polymerizing the first monomer and the second monomer.

12. The method of claim 11, wherein the potential is applied for 0.5-10 minutes.

13. The method of claim 11, wherein the potential is in a range of 1.45-1.55 V.

14. The method of claim 11, wherein an area of the working electrode is in a range of 0.05-1 cm$^2$.

15. The method of claim 11, wherein the electrolyte is tetrabutylammonium tetrafluoroborate.

16. The method of claim 11, wherein the electrolyte is present at a concentration in a range of 0.01-1 M in the solution.

17. The method of claim 11, wherein the solvent is acetonitrile.

18. The method of claim 11, wherein the first monomer is:

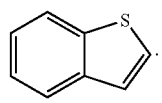

19. The method of claim 11, wherein the compound represented by formula (II) is:

* * * * *